(12) United States Patent
Yagishita

(10) Patent No.: US 8,152,421 B2
(45) Date of Patent: Apr. 10, 2012

(54) APPARATUS AND METHOD FOR DRILLING A WORK

(75) Inventor: Hukuzo Yagishita, Numazu (JP)

(73) Assignee: Hukuzo Yagishita (JP)

( * ) Notice: Subject to any disclaimer, the term of this patent is extended or adjusted under 35 U.S.C. 154(b) by 315 days.

(21) Appl. No.: 12/620,813

(22) Filed: Nov. 18, 2009

(65) Prior Publication Data

US 2010/0067997 A1  Mar. 18, 2010

Related U.S. Application Data

(63) Continuation of application No. PCT/JP2008/001232, filed on May 16, 2008.

(30) Foreign Application Priority Data

May 18, 2007 (JP) ................................. 2007-132689

(51) Int. Cl.
    B23C 1/00    (2006.01)
(52) U.S. Cl. ......................... 409/132; 409/200; 409/231
(58) Field of Classification Search .......... 409/131–132, 409/74–78, 199–200, 231; 408/150–151, 408/124, 702; 82/1.2, 1.4; *B23C 1/00, 1/02*
    See application file for complete search history.

(56) References Cited

U.S. PATENT DOCUMENTS

| | | | | |
|---|---|---|---|---|
| 2,054,168 A * | 9/1936 | Roehm | ......................... | 409/200 |
| 2,289,111 A * | 7/1942 | Fett | ............................... | 409/200 |
| 3,453,910 A * | 7/1969 | Hautau | ............................ | 408/22 |
| 4,014,439 A * | 3/1977 | Kochsiek et al. | ............. | 414/787 |
| 4,789,278 A * | 12/1988 | Dexter et al. | ................... | 409/200 |
| 5,197,836 A * | 3/1993 | Crivellin | ........................ | 409/200 |
| 5,328,306 A | 7/1994 | Rehm et al. | | |
| 5,482,415 A | 1/1996 | Belaga et al. | | |
| 5,642,970 A | 7/1997 | Yamaguchi et al. | | |
| 5,816,755 A | 10/1998 | Thelin | | |
| 5,971,678 A * | 10/1999 | Linderholm | ................... | 409/132 |
| 6,533,508 B1 * | 3/2003 | Nonaka | ........................ | 409/132 |
| 6,758,642 B2 * | 7/2004 | Linderholm et al. | ......... | 409/175 |
| 6,840,722 B1 * | 1/2005 | Nonaka | ......................... | 409/132 |
| 6,872,036 B2 * | 3/2005 | Linderholm | .................. | 409/200 |
| 7,351,018 B2 * | 4/2008 | Oden et al. | ..................... | 409/131 |
| 2002/0094249 A1 | 7/2002 | Linderholm | | |
| 2003/0017017 A1 | 1/2003 | Linderholm et al. | | |
| 2006/0165500 A1 | 7/2006 | Linderholm | | |

FOREIGN PATENT DOCUMENTS

DE  693 14 227  1/1998

(Continued)

*Primary Examiner* — Daniel Howell
(74) *Attorney, Agent, or Firm* — Harness, Dickey & Pierce, P.L.C.

(57) ABSTRACT

An apparatus for drilling a workpiece has a shaft portion including a holder to hold a drilling tool rotating around a first axis. A reduction gear is connected to the shaft portion. A cylindrical member, including an outer cylinder and an inner cylinder, rotatably contains the shaft portion at an eccentric position. The cylindrical member is connected to the output shaft of the reduction gear and rotated around a second axis parallel to the first axis. A slide containing cylinder contains the shaft portion, the reduction gear and the cylindrical member. The slide containing cylinder has a sliding structure for axially moving the shaft portion, the reduction gear and the cylindrical member. A drilling tool is simultaneously rotated around the first axis, revolved around the second axis and is axially moved.

12 Claims, 24 Drawing Sheets

FOREIGN PATENT DOCUMENTS

| | | |
|---|---|---|
| EP | 0 571 352 | 10/1997 |
| EP | 1 125 666 | 8/2001 |
| FR | 2481169 A * | 10/1981 |
| JP | 63-158715 | 10/1988 |
| JP | 01092013 A * | 4/1989 |
| JP | 09-011020 | 1/1997 |
| JP | 09-085565 | 3/1997 |
| JP | 2000117524 A * | 4/2000 |
| JP | 2003-181713 | 7/2003 |
| JP | 2004-122274 | 4/2004 |
| JP | 2004-534666 | 11/2004 |
| JP | 2005-126557 | 5/2005 |
| SE | 9202658 | 3/1994 |
| WO | WO88/00507 | 1/1988 |
| WO | WO03/008136 | 1/2003 |

* cited by examiner

[Fig 1]
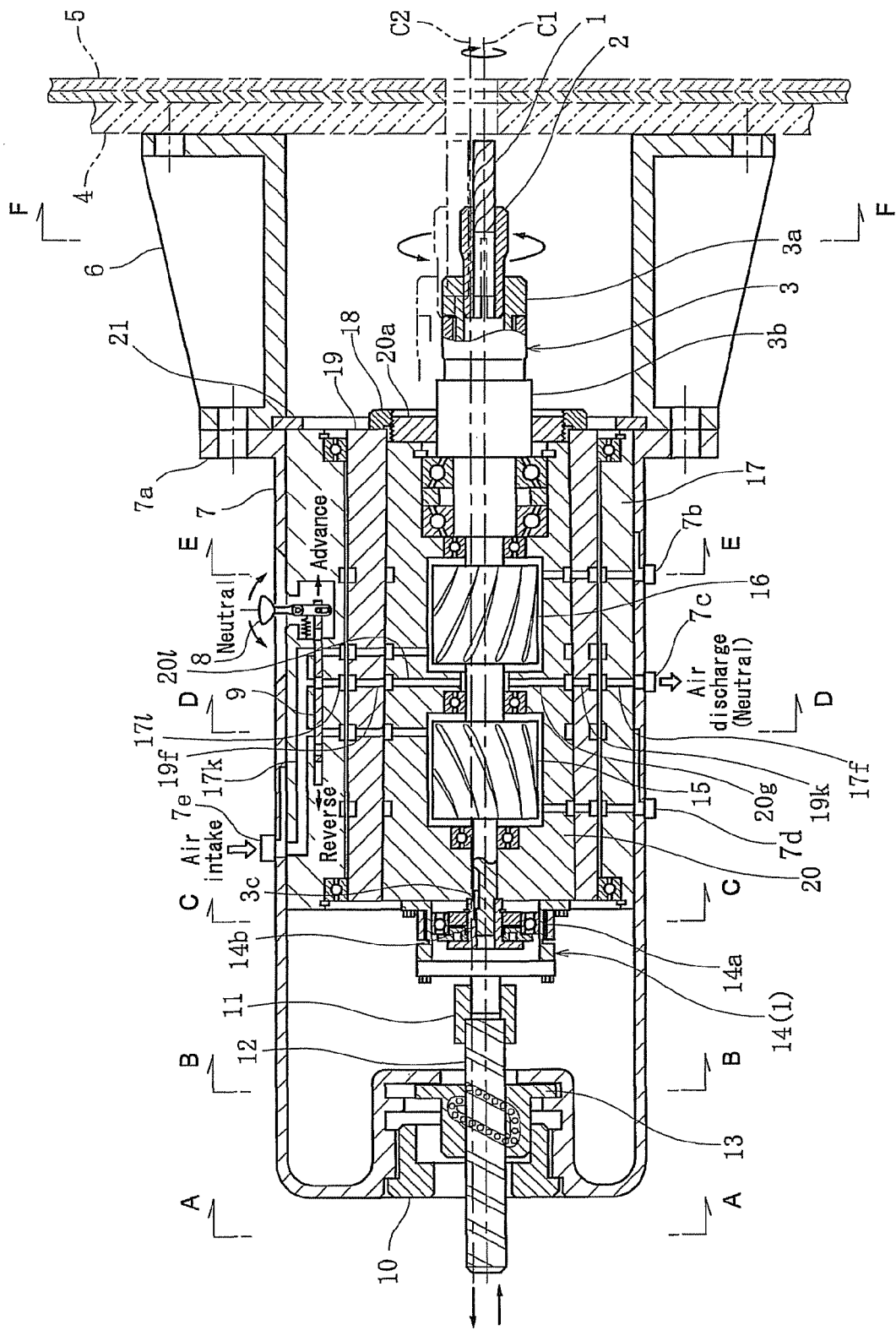

[Fig 2]
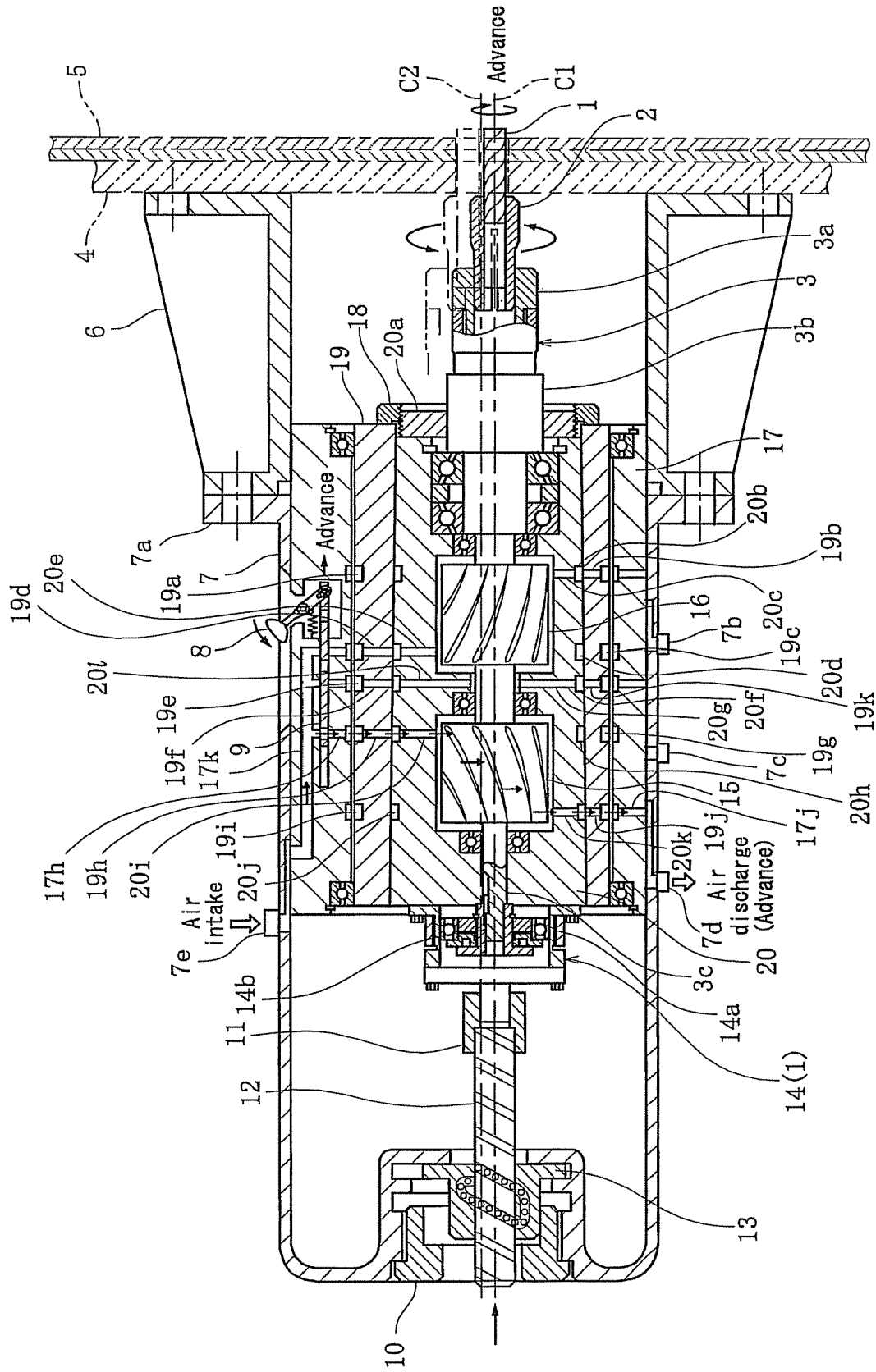

[Fig 3]
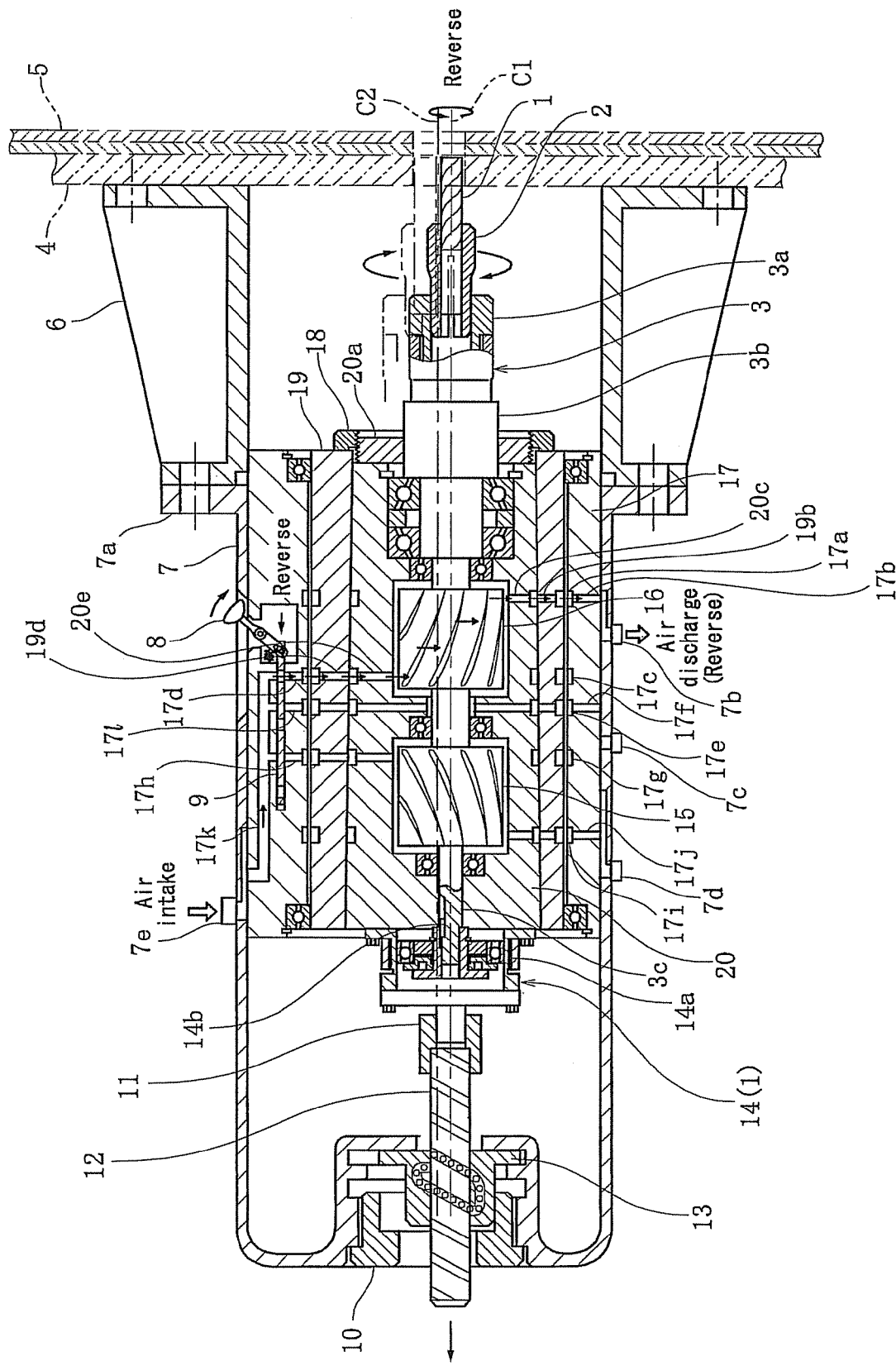

[Fig 4]
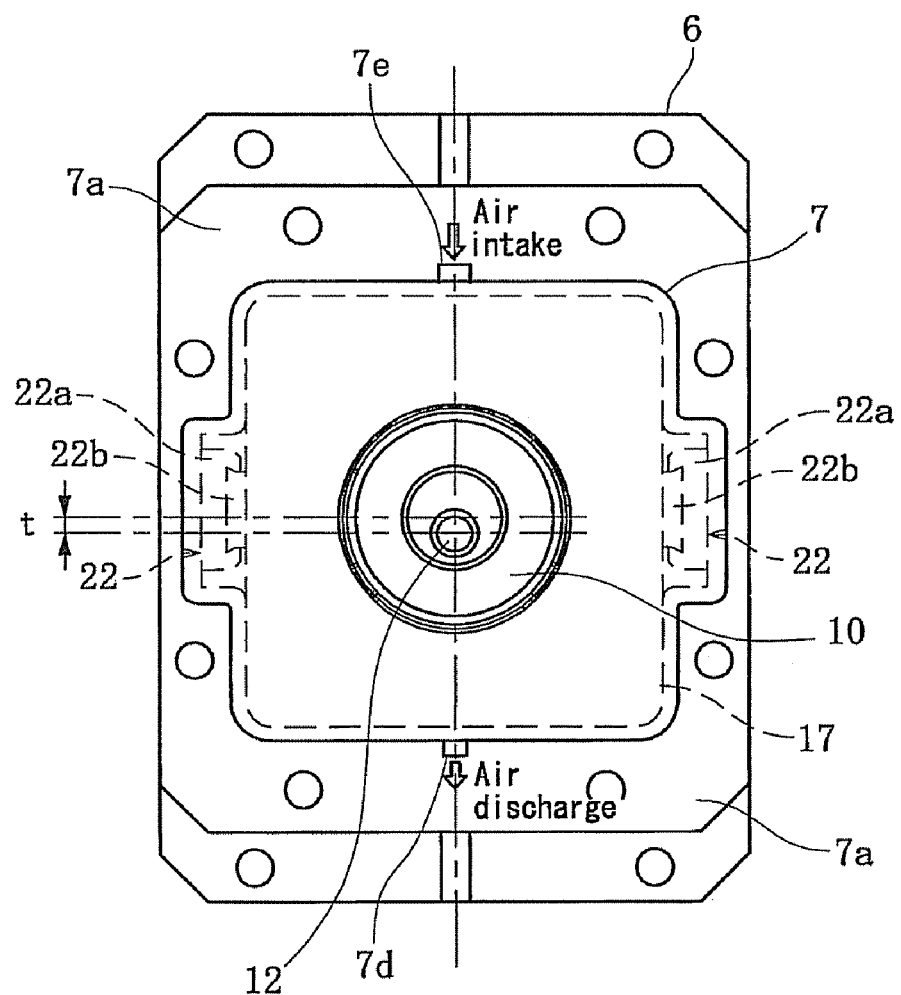

[Fig 5]
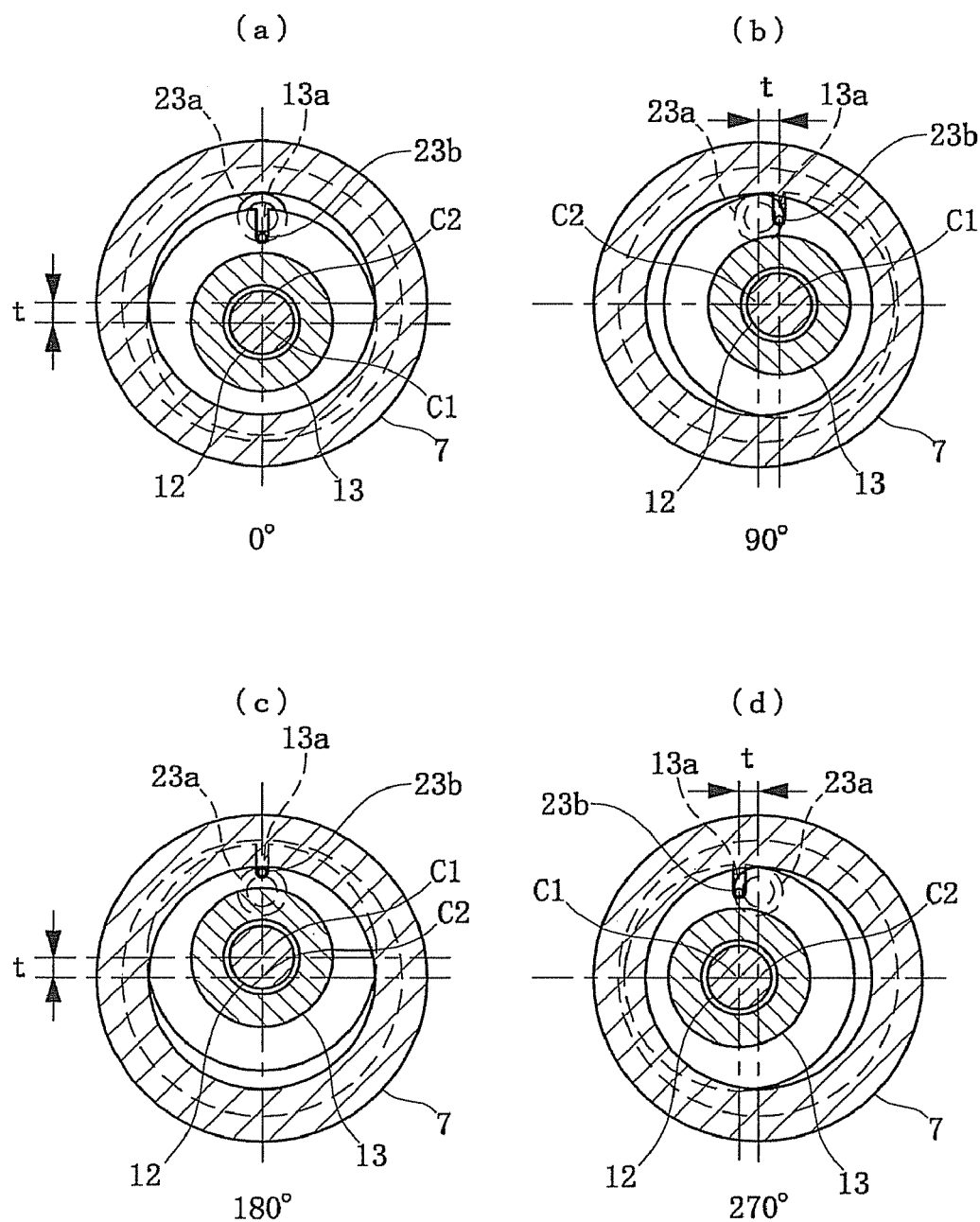

[Fig 6]
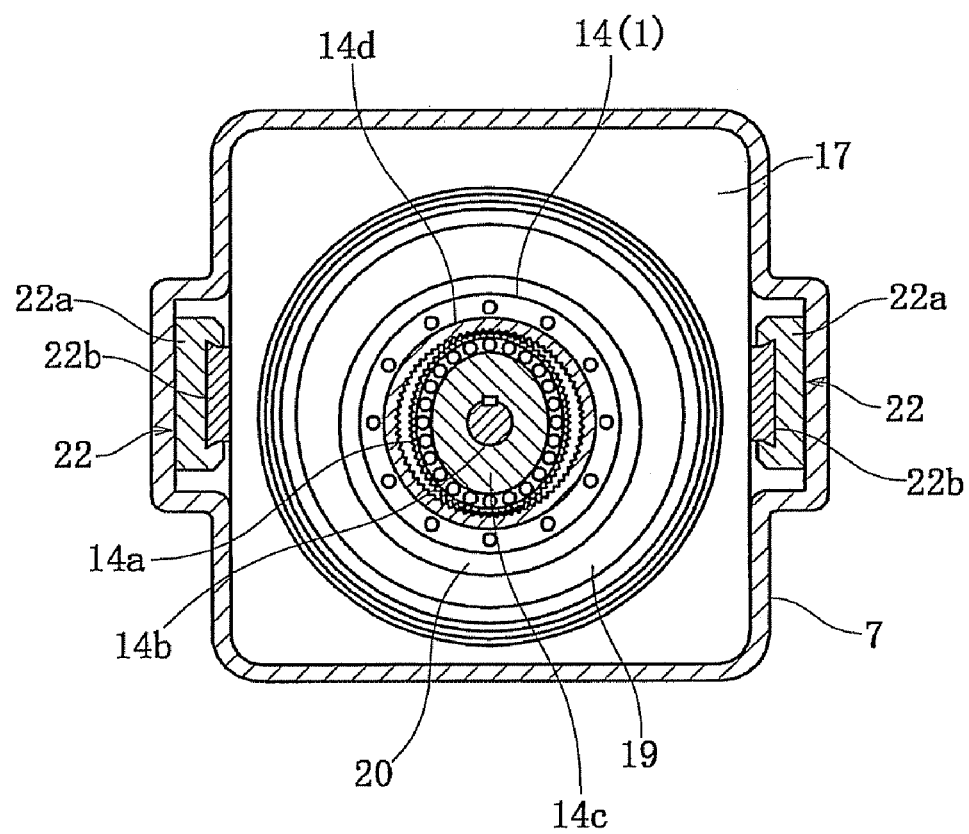

[ Fig 7 ]
(a)
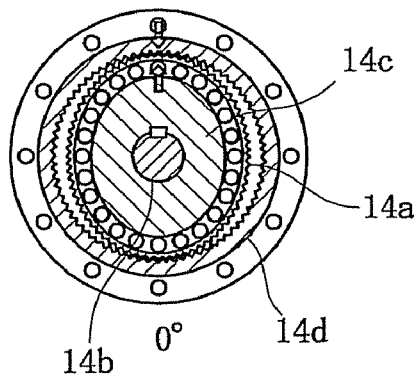
(b)
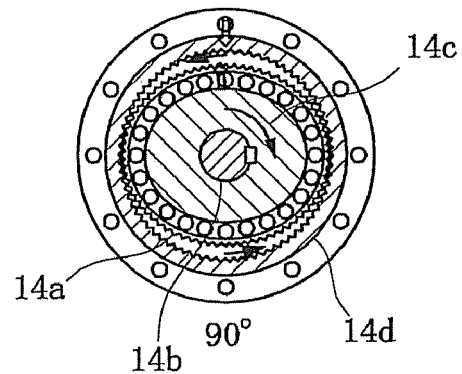
(c)
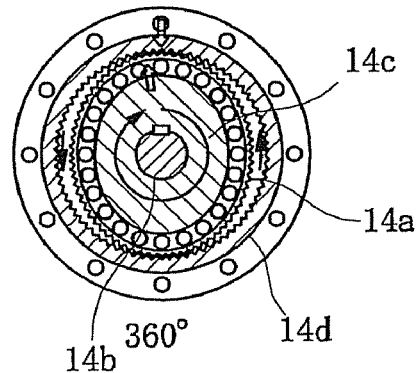

[ Fig 8 ]
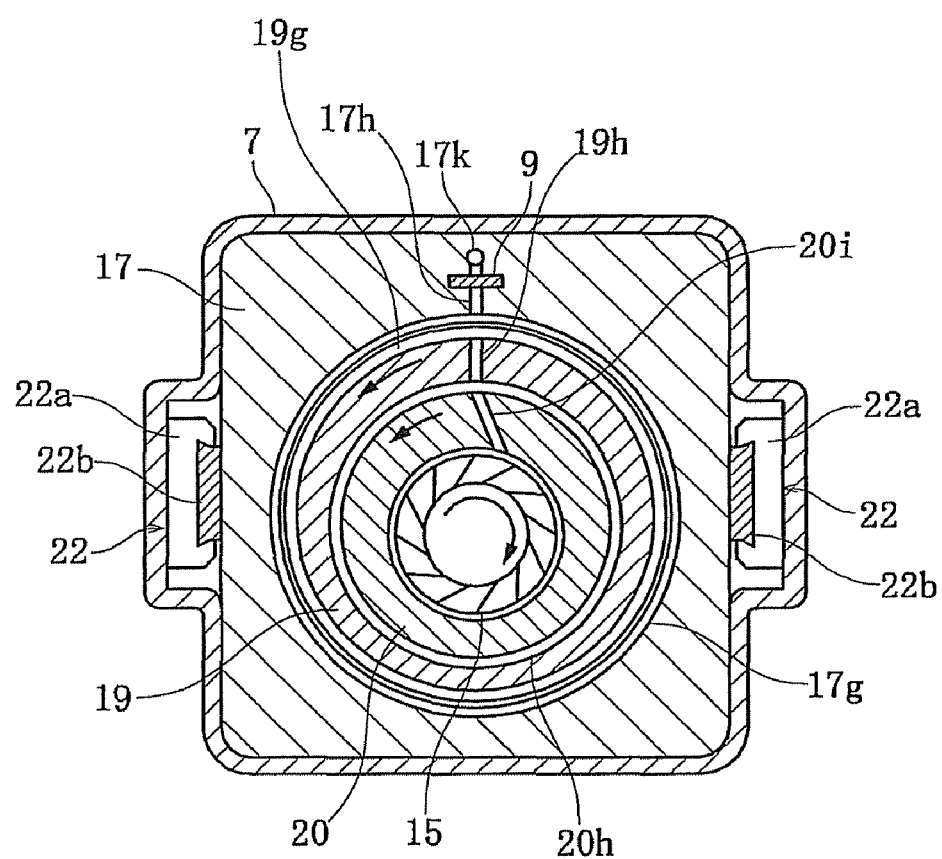

[Fig 9]
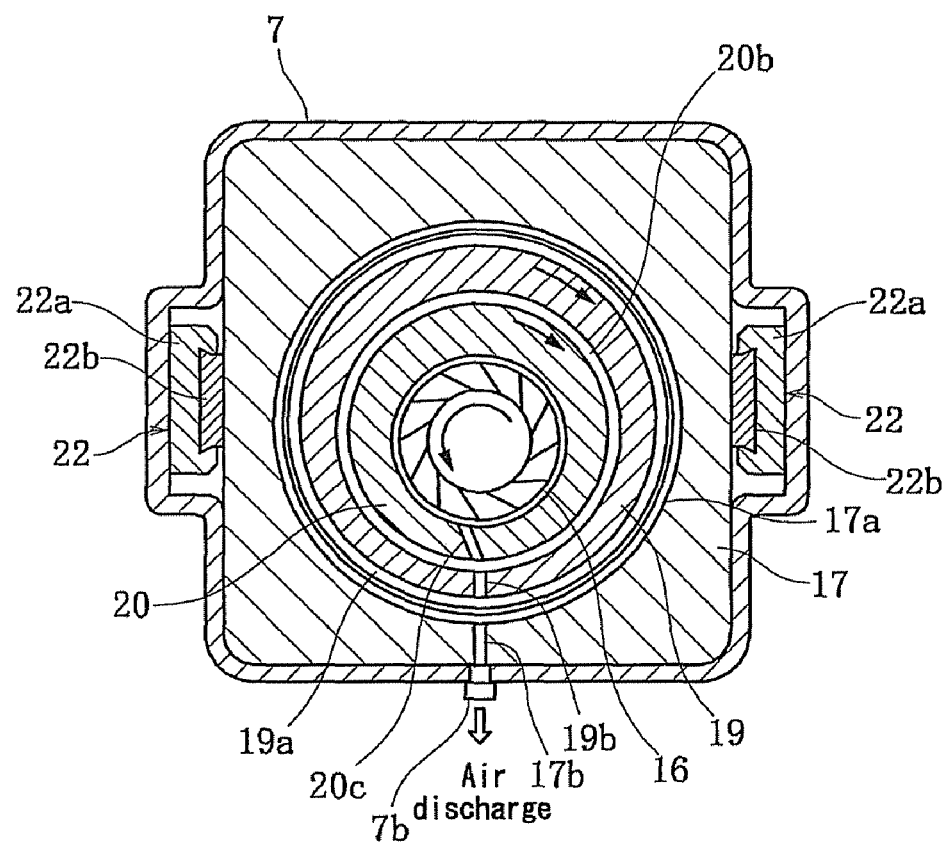

[ Fig 10 ]
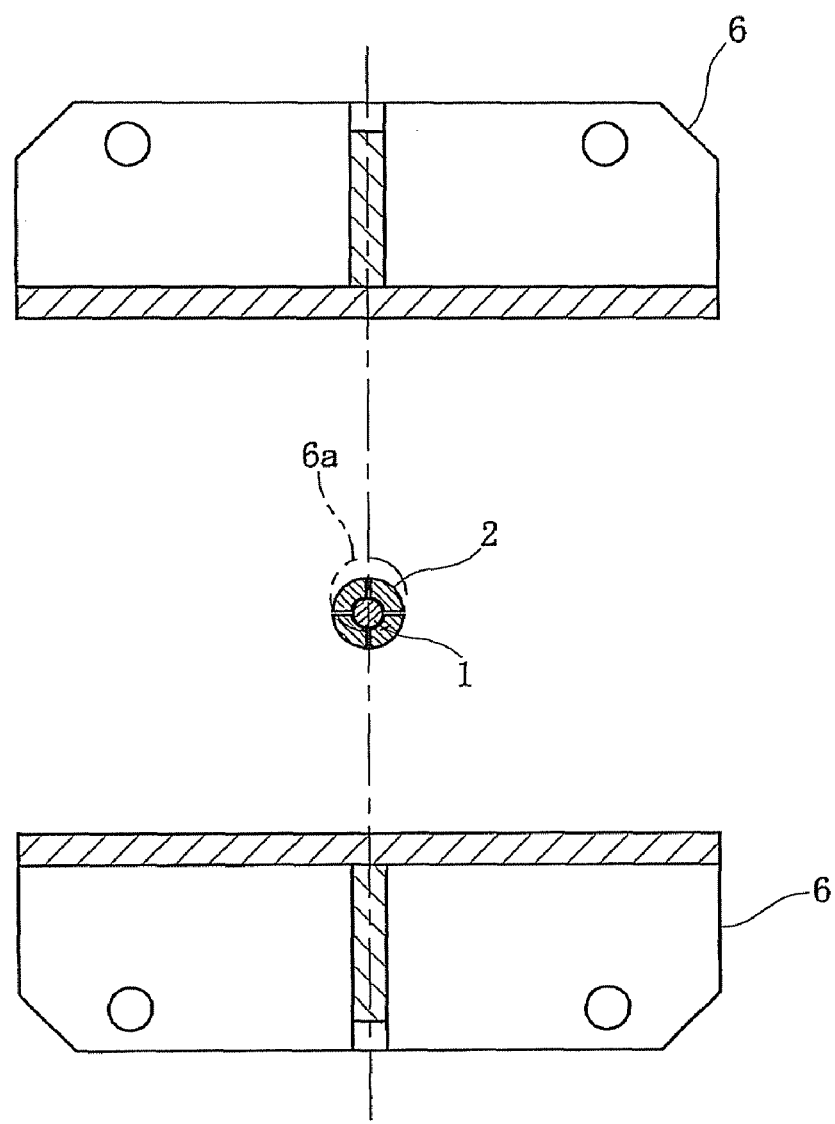

[Fig 11]
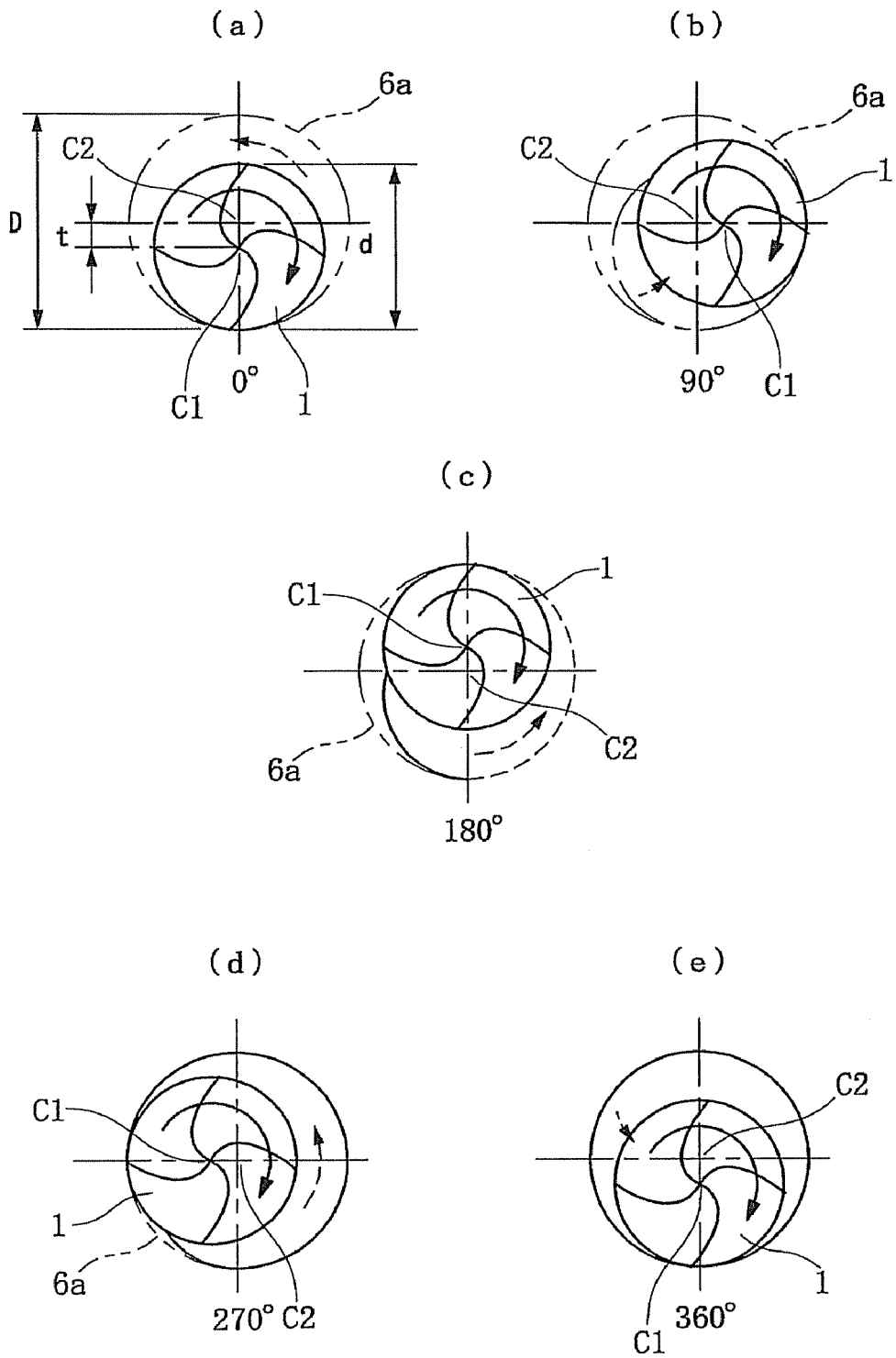

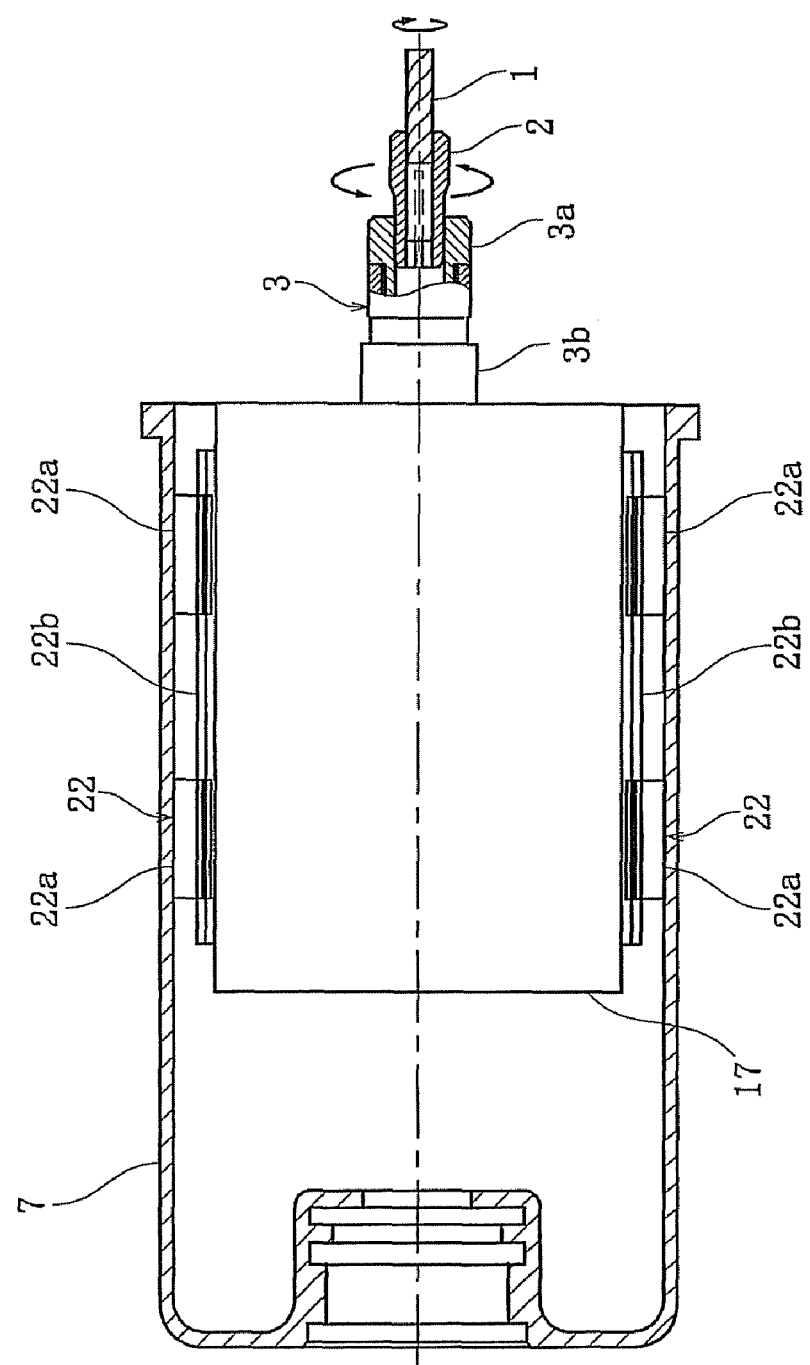
[Fig 12]

[ Fig 13 ]
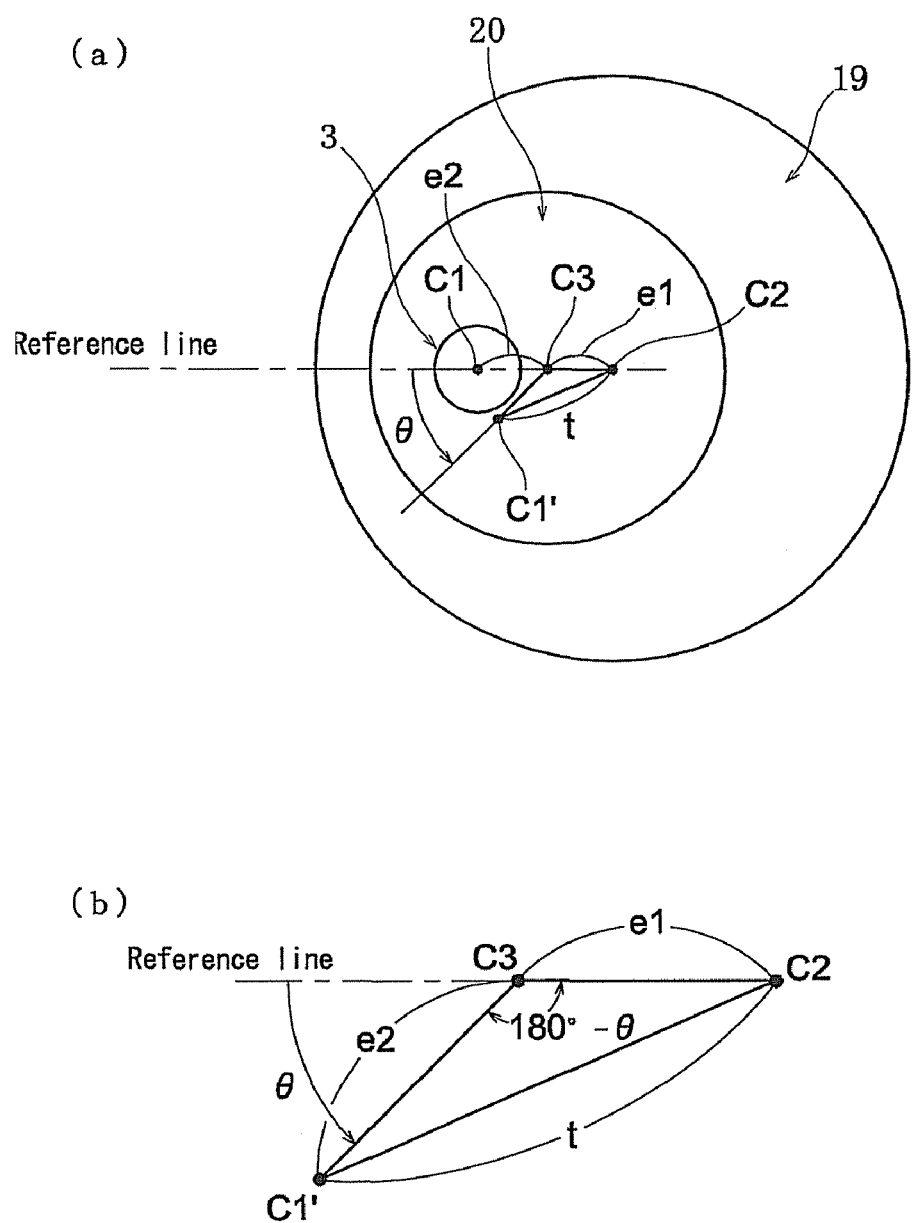

[ Fig 14 ]
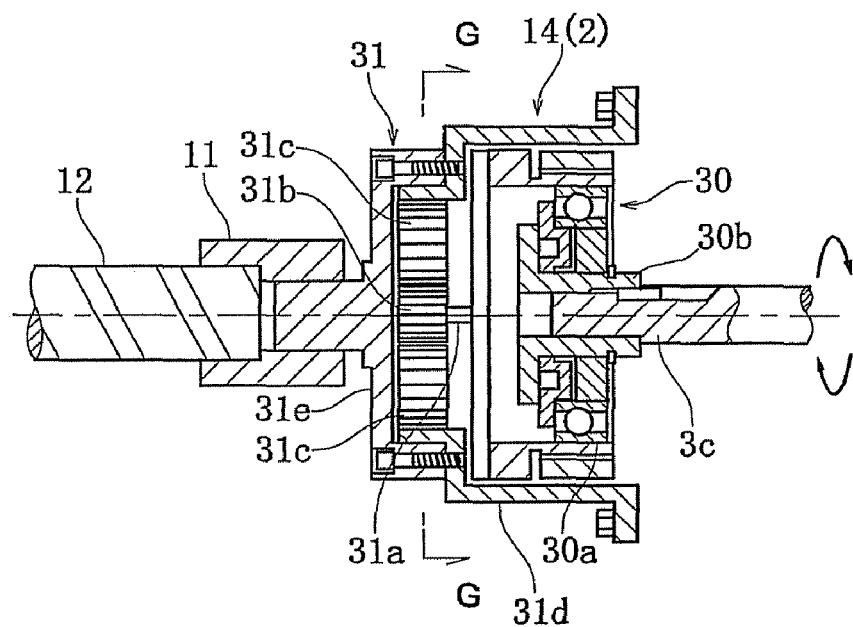
[ Fig 15 ]
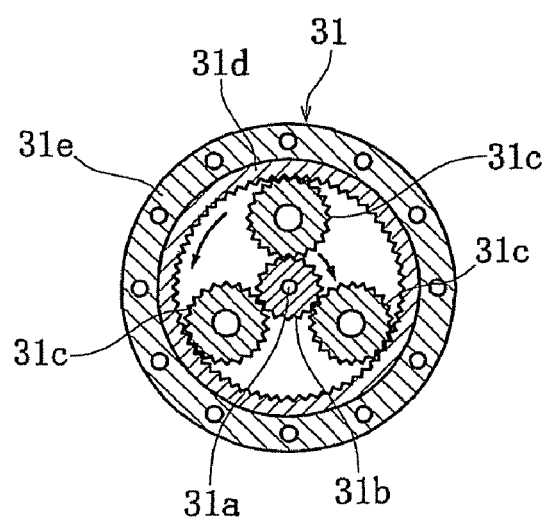

[ Fig 16 ]
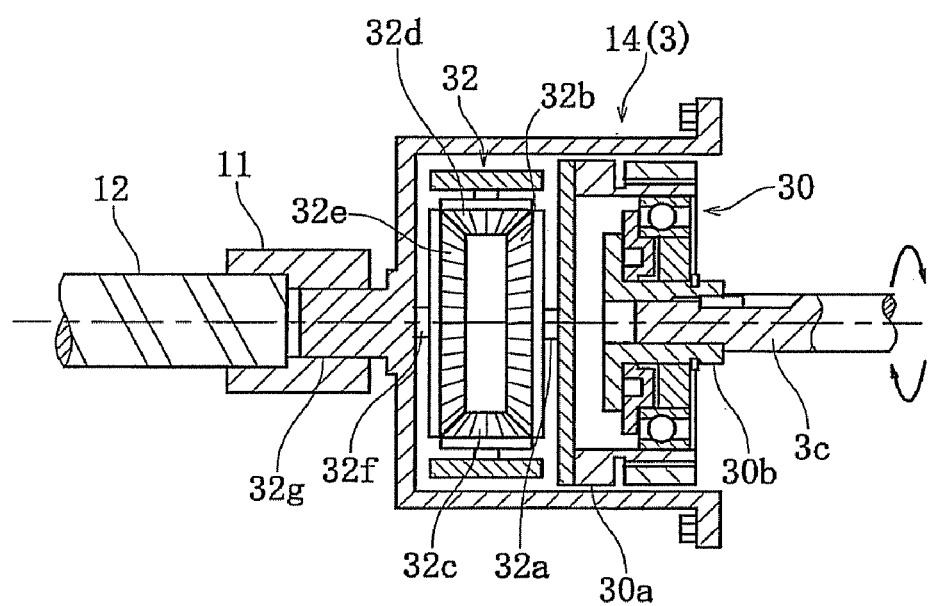

[ Fig 17 ]
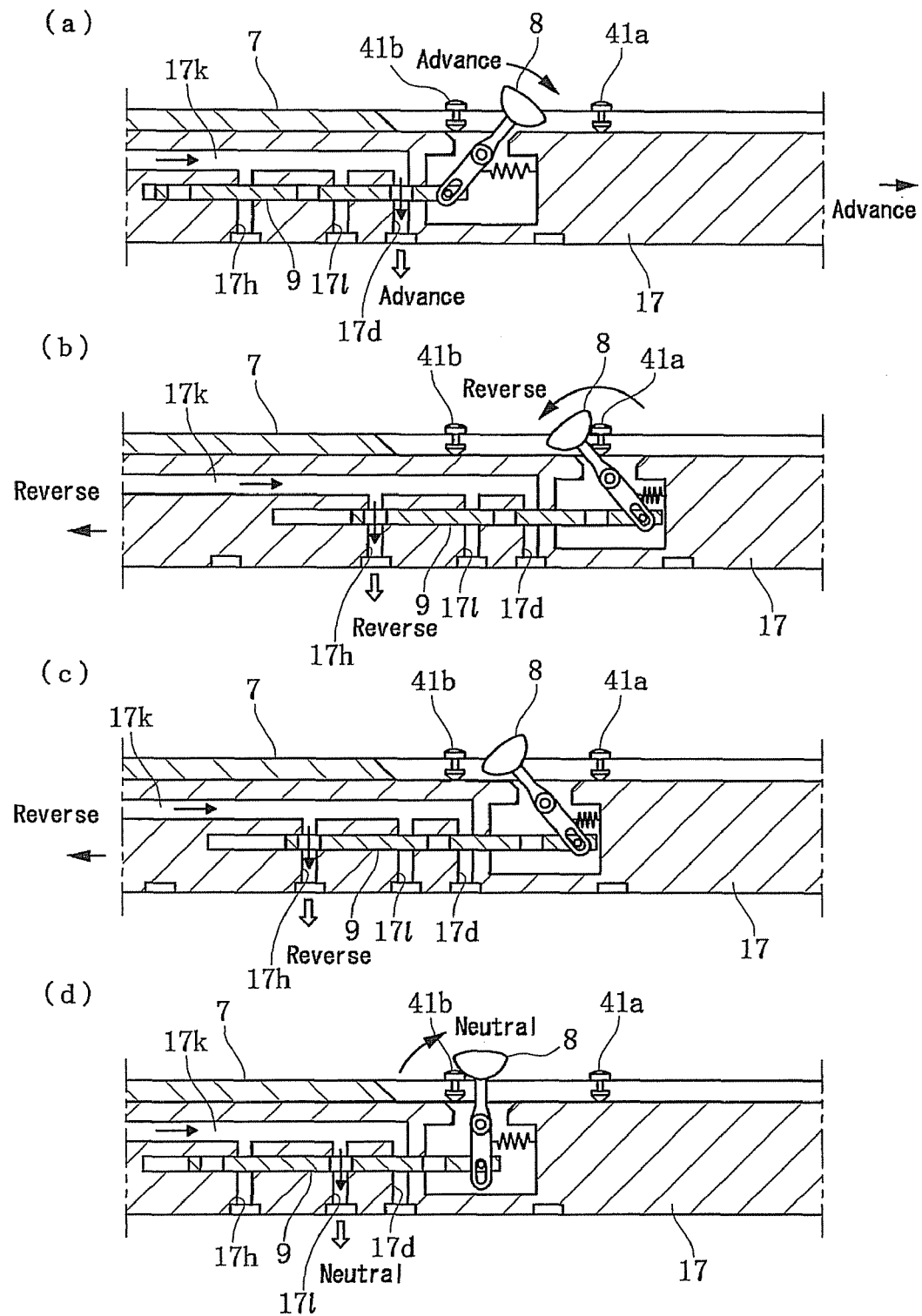

[Fig 18]
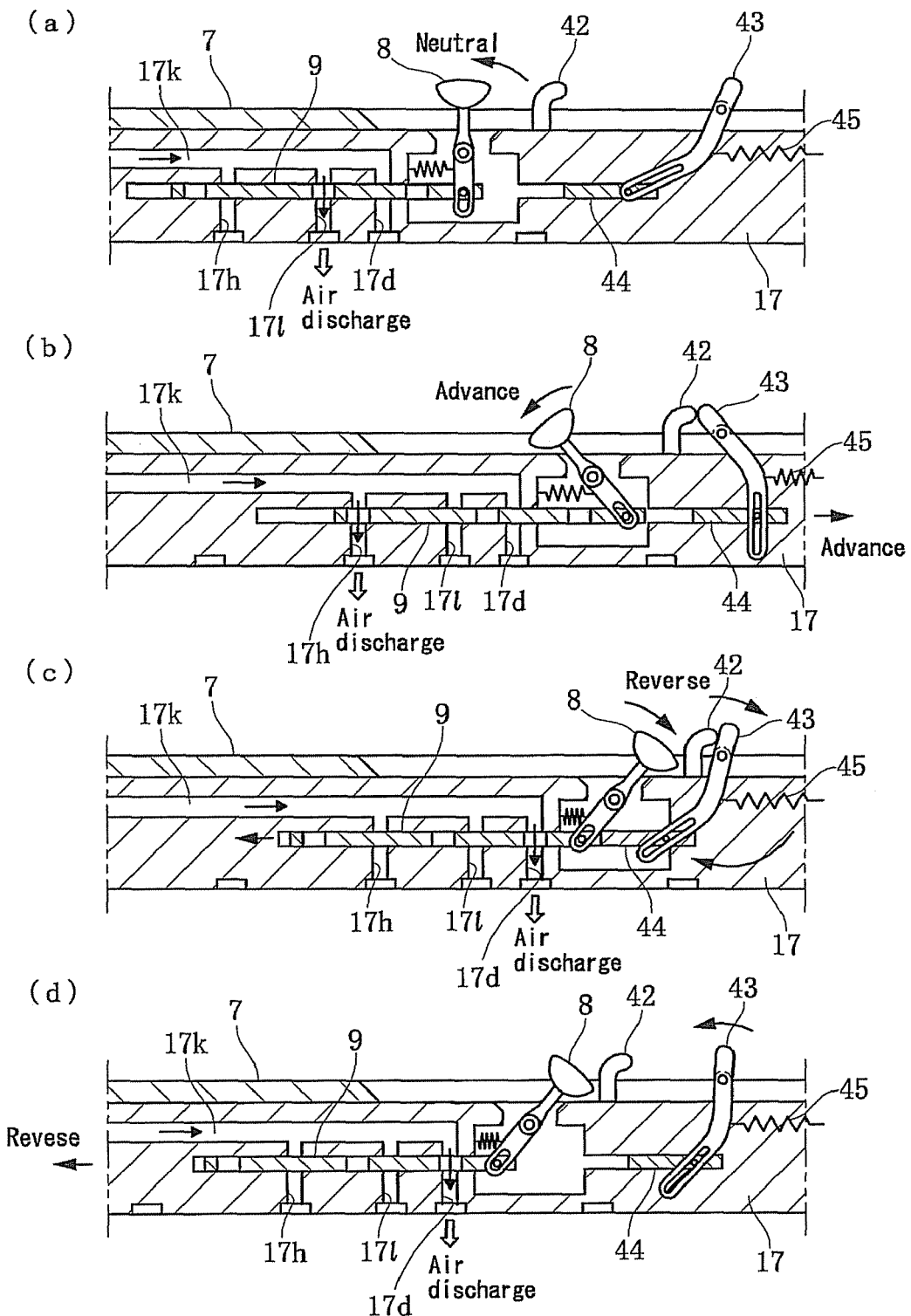

[Fig 19]
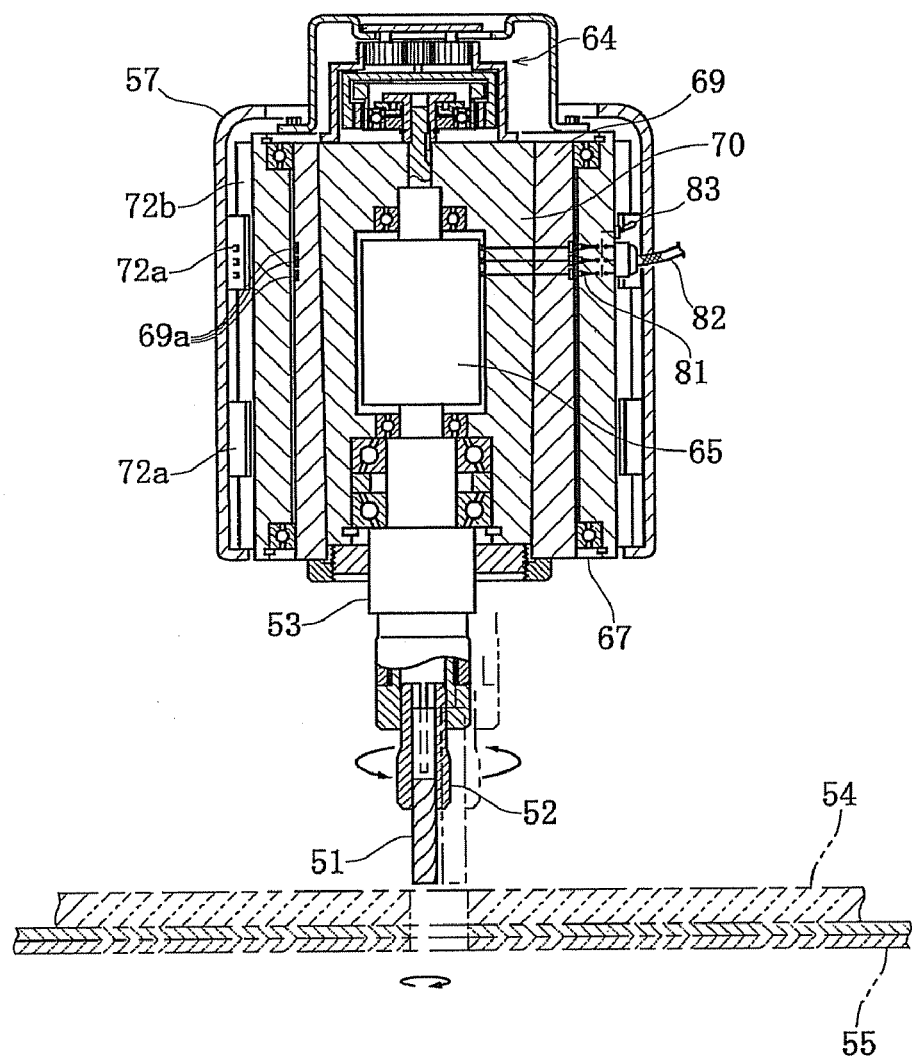

[Fig 20]
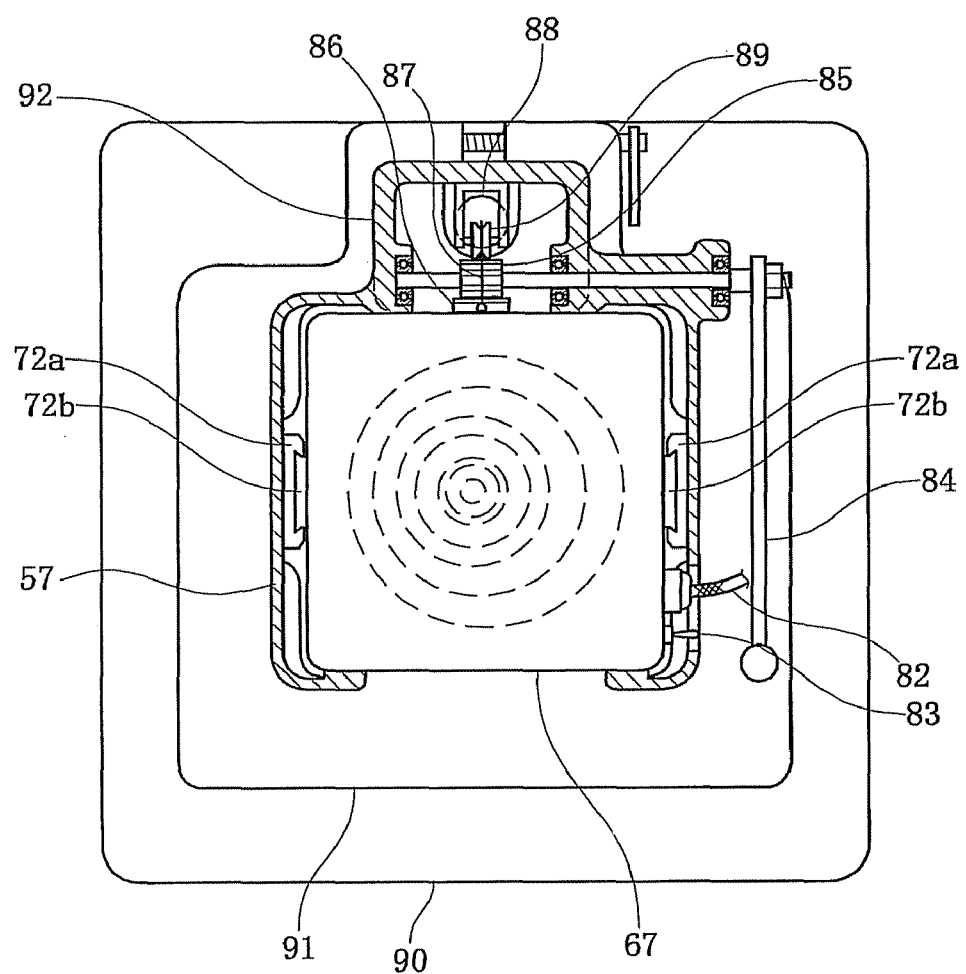

[Fig 21]
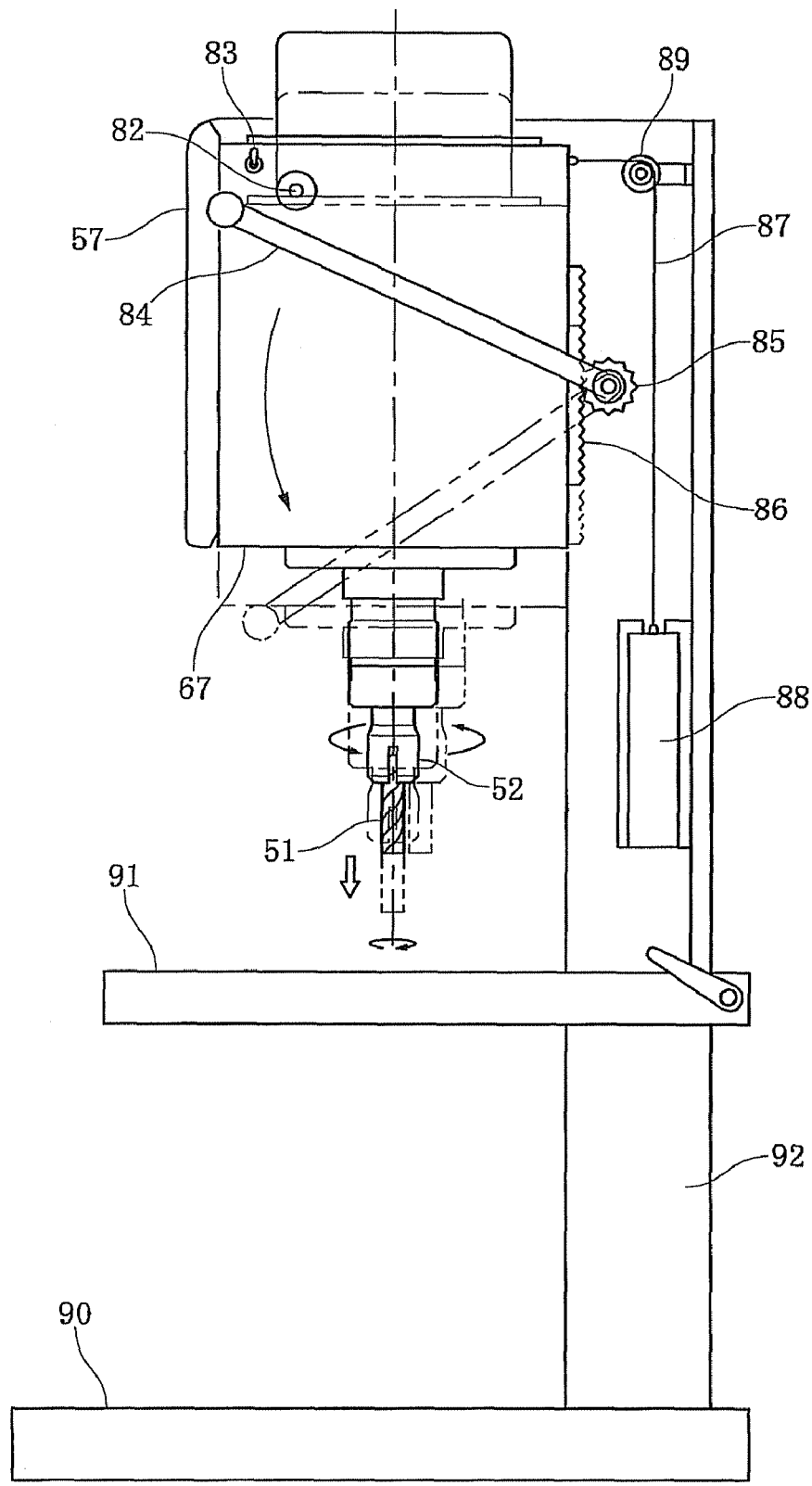

[Fig 22]
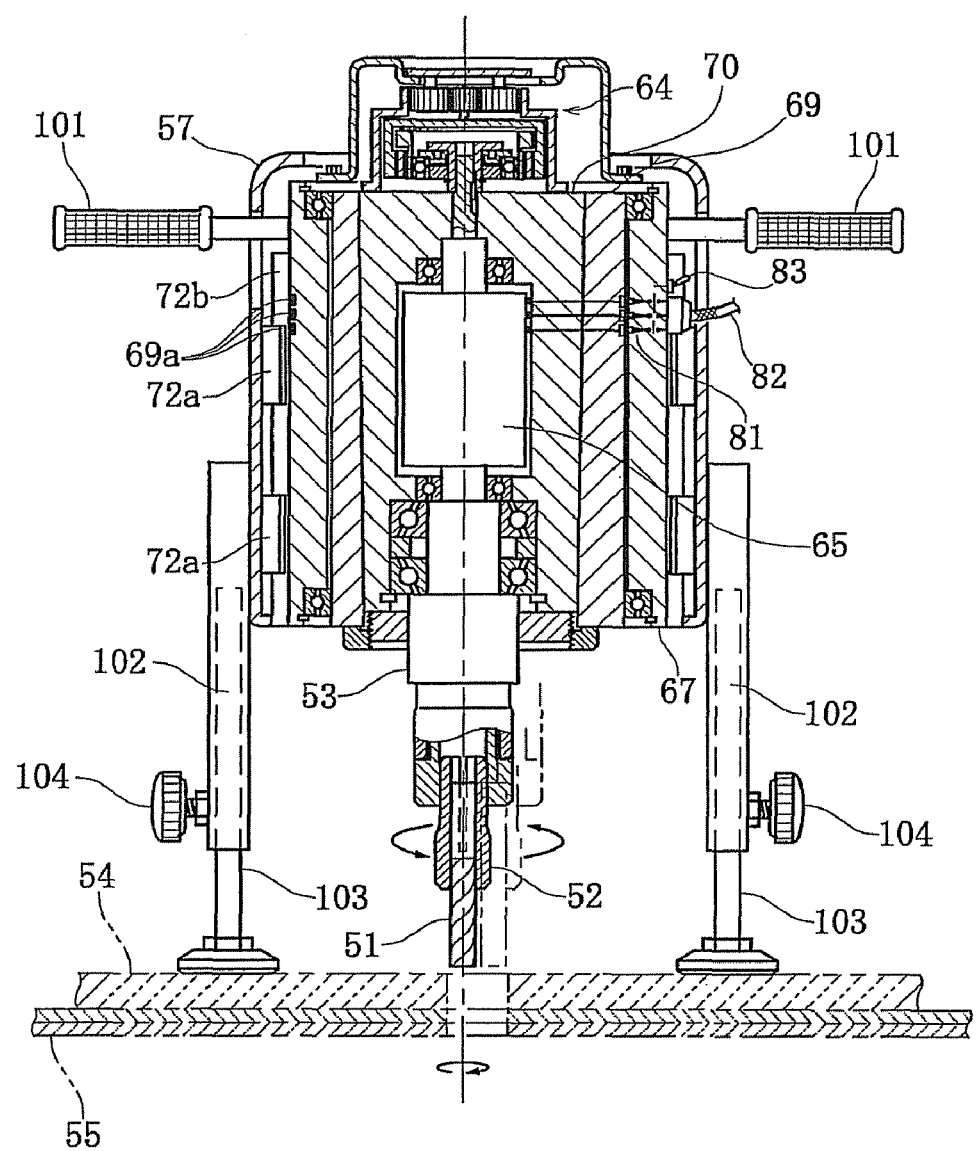

[Fig 23]
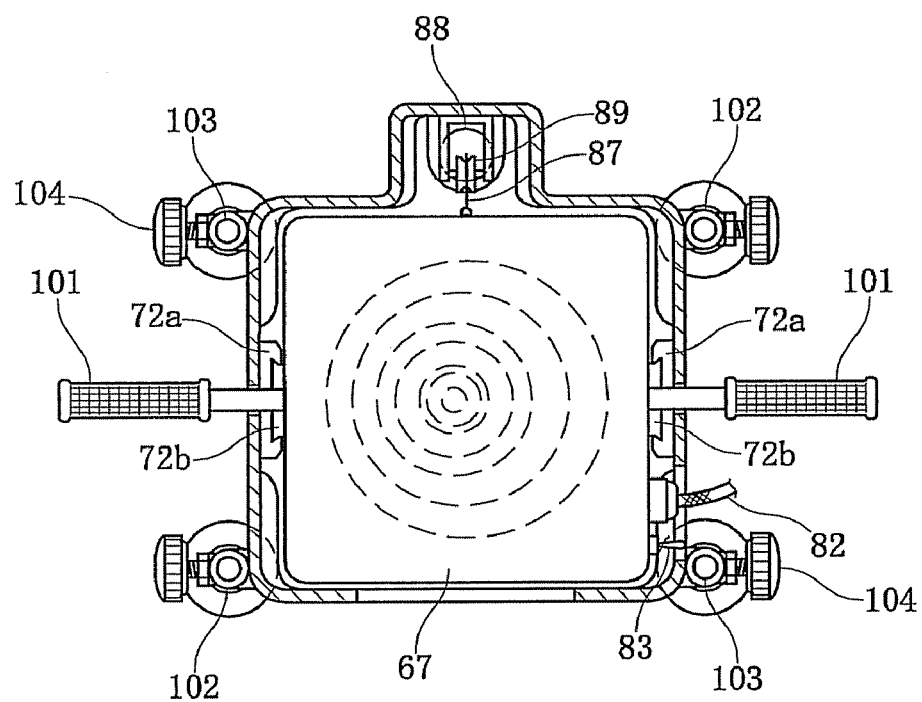

[ Fig 24 ]
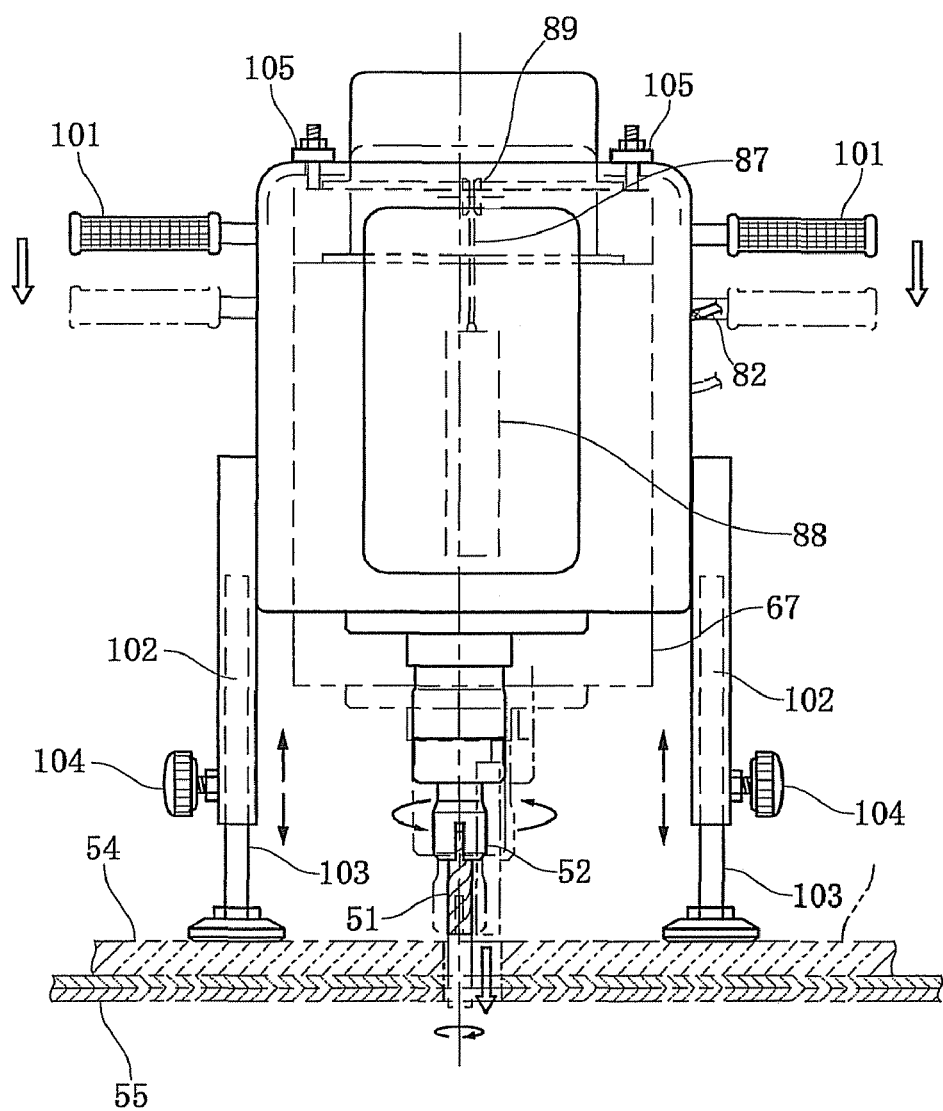

[ Fig 25 ]
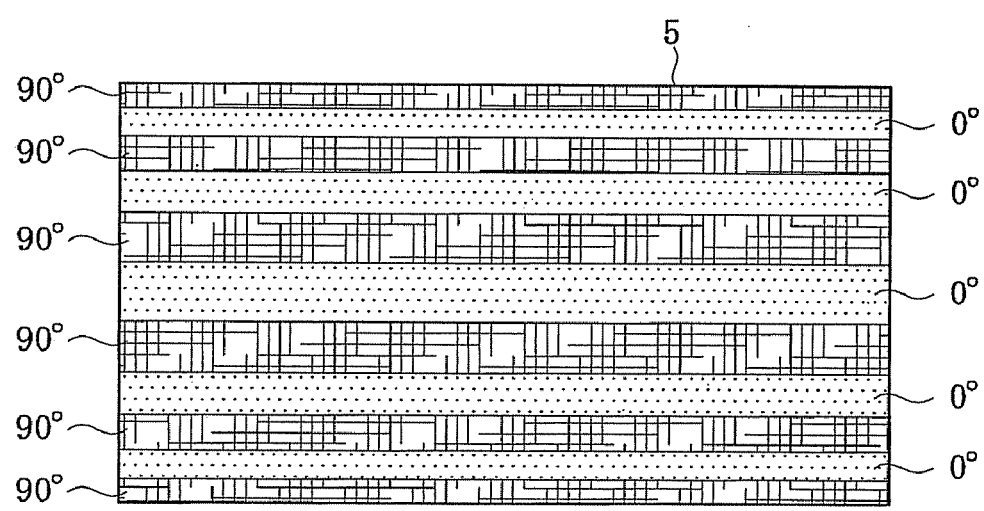

APPARATUS AND METHOD FOR DRILLING A WORK

CROSS-REFERENCE TO RELATED APPLICATIONS

This application is a continuation of International Application No. PCT/JP2008/001232, filed May 16, 2008, which claims priority to Japanese Application No. 2007-132689, filed May 18, 2007. The disclosures of the above applications are incorporated herein by reference.

FIELD

The present disclosure relates to an apparatus (or an eccentric drive drilling apparatus) and a method for drilling a workpiece, such as fiber reinforced plastic member or its laminated member, using a drilling tool, such as an end mill.

BACKGROUND

Recently, it has been realized that bodies for aircrafts or automobiles or their structural parts are formed from fiber reinforced plastic (FRP) to reduce the weight of bodies. Various kinds of FRP have been proposed such as thermosetting plastic including carbon fibers as reinforcing fibers (CFRP), thermosetting plastic including glass fibers as reinforcing fibers (GFRP) or thermosetting plastics including, as reinforcing fibers, heat resistant synthetic resin fibers such as aromatic polyamide, aromatic polysulfone, aromatic polyimide etc. Usually, a laminated member is formed with a plurality of resin layers with the reinforcing fibers alternately arranged in an oblique or an oblique cross fashion (see Reference Patent Document No. 1). Reference Patent Document No. 1: Japanese Laid-open Patent Publication No. 126557/2005.

In using FRP members as structural elements for bodies of aircrafts or automobiles, it is usually required to form apertures, by drilling, for passing fasteners, such as bolts etc., and connecting the structural elements. The apertures in FRP members (e.g. an FRP member and laminated member including therein carbon fibers, glass fibers etc.) are formed using a general drilling apparatus, constructed so that a drilling tool is simply rotated by a driving spindle. The drilled surface of the aperture, formed by such a general drilling apparatus, is rough. This is due to heat generated by frictional resistance during the drilling process. Additionally, the life of the drilling tool of such as a drill is extremely shortened.

It is supposed that the irregular deformation in the surface of a drilled aperture is caused by an excessive generation of heat in the cutting edges of the drilling tool. This is caused by the drilled surface of FRP members where the reinforcing fibers (e.g. carbon fibers, glass fibers etc.) are arranged in the same direction as the cutting direction of the drilling tool in the general drilling apparatus. In addition, it is also supposed that the life of the drilling tool would be shortened by the excessive heat giving rise to adverse effects on its cutting edges.

SUMMARY

It is therefore an object of the present disclosure to provide an apparatus and a method for drilling a workpiece that can improve the drilling accuracy and sufficiently extend the life of the cutting tool especially in its cutting performance.

According to one aspect of the present disclosure, an apparatus for drilling a workpiece comprises a shaft portion rotating around a first axis. The shaft portion includes a holder for holding a drilling tool. A reduction gear is connected to the shaft portion. A cylindrical member, including an outer cylinder and an inner cylinder, rotatably contains the shaft portion at an eccentric position. The cylindrical member is connected to the output shaft of the reduction gear and rotates around a second axis parallel to the first axis. A slide containing cylinder, containing the shaft portion, the reduction gear and the cylindrical member, includes a sliding structure for axially moving the shaft portion, the reduction gear and the cylindrical member. The workpiece is drilled by simultaneously performing a rotation around the first axis, a revolution around the second axis and an axial movement of the drilling tool. This occurs by rotating the shaft portion which rotates the input shaft of the reduction gear which simultaneously rotates the cylindrical member, connected to the output shaft of the reduction gear, around the second axis, at a predetermined reduction ratio.

According to the apparatus for drilling a workpiece of the present disclosure, generation of excessive heat in a drilled surface of a workpiece can be prevented since the drilling is performed by simultaneously performing the rotation and revolution of a drilling tool such as an end mill. This is unlike the drilling method of the prior art where drilling is performed by only rotating a drilling tool. In addition, even if a laminated member of FRP is used as a workpiece, since excessive heat does not give rise to an adverse effect on the thermosetting or thermoplastic resin forming the matrix of the FRP, it is possible to substantially eliminate the generation of irregularities on a drilled surface and to improve the drilling accuracy. Furthermore, since excessive heat giving rise to an adverse effect on the cutting performance of a drilling tool can be extremely reduced, it is possible to unexpectedly extend the life of a cutting tool.

According to the present disclosure, the drilling of the workpiece is performed by a down cut where the directions of the rotation and the revolution of the drilling tool are different from each other. This makes it possible to improve the biting ability into a workpiece (e.g. CFRP, GFRP etc.) of cutting edges of a drilling tool and to reduce heat generation, and thus to further improve the drilling accuracy of a drilled surface of an aperture.

In addition, since temperature rise at the drilled surface can be suppressed according to the present disclosure, it is possible to suitably apply the method and apparatus of the present disclosure to drilling of titanium and inconel alloys that are difficult to cut due to their low heat conductivity and of resin materials (including composite materials).

In the present disclosure, it is preferable that a ratio of a diameter of the drilling tool and a distance between the first axis of the shaft portion and the second axis of the cylindrical member is in a range of 10:0.1-10:1.5. For example, when the diameter of a drilling tool is 5 mm, it is possible to set the distance between the first and second axes at a range of 0.05-0.75 mm. As a result of which, it is possible to form an aperture having an inner diameter of about 5.1-6.5 mm and thus to form a gap between a drilling tool and an aperture for discharging cut-out debris. In addition since excessive heat generation in cutting edges of a drilling tool and a drilled surface can be suppressed, it is possible to improve the drilling accuracy and to extend the life of a drilling tool.

It is also preferable in the present disclosure that the predetermined reduction ratio of the reduction gear between the shaft portion and the cylindrical member is range of 1:140-1:70. This makes it possible to improve the balance of the rotation and the revolution of a shaft portion where a drilling tool is mounted and thus to suitably perform the drilling of a workpiece.

It is preferable in the present disclosure that the speed of the rotation of the drilling tool is a range of 1500-4000 rpm, more preferably between 2000-3000 rpm. The predetermined reduction ratio is in a range of 1:120-1:80. This makes it possible to improve the balance of the rotation and the revolution of a shaft portion where a drilling tool is mounted. Thus, this achieves intermittent contacts between the cutting edges of the drilling tool and the drilling surface. Accordingly, cutting at the drilling surface can be suitably performed with suppressing heat generation at the drilling surface. Thus, it is possible to suitably perform the drilling process at higher drilling accuracy.

According to another aspect of the present disclosure, a method for drilling a workpiece comprises providing a shaft portion including a holder for holding a drilling tool rotating around a first axis. A reduction gear is connected to the shaft portion. A cylindrical member, including an outer cylinder and an inner cylinder, rotatably contains the shaft portion at an eccentric position. The cylinder member is connected to the output shaft of the reduction gear and is rotated around a second axis parallel to the first axis. A slide containing cylinder contains the shaft portion. The reduction gear and the cylindrical member are provided with a sliding structure to axially move the shaft portion, the reduction gear and the cylindrical member. The workpiece is drilled by simultaneously performing a rotation around the first axis, a revolution around the second axis and an axial movement of the drilling tool. The drilling tool is rotated by the shaft portion which, in turn, rotates the input shaft of the reduction gear. Simultaneously, the cylindrical member, connected to the output shaft of the reduction gear, is rotated the second axis at a predetermined reduction ratio.

According to the apparatus for drilling a workpiece, it comprises a shaft portion including a holder for holding a drilling tool rotating around a first axis. A reduction gear is connected to the shaft portion. A cylindrical member, including an outer cylinder and an inner cylinder, rotatably contains the shaft portion at an eccentric position. The cylindrical member is connected to the output shaft of the reduction gear and is rotated around a second axis parallel to the first axis. A slide containing cylinder contains the shaft portion, the reduction gear and the cylindrical member. The slide containing cylinder has a sliding structure for axially moving the shaft portion, the reduction gear and the cylindrical member. The workpiece is drilled by simultaneously performing a rotation around the first axis, a revolution around the second axis and an axial movement of the drilling tool. The drilling tool is rotated by the shaft portion which, in turn, rotates the input shaft of the reduction gear. Simultaneously, the cylindrical member, connected to the output shaft of the reduction gear, is rotated around the second axis at a predetermined reduction ratio. Thus, it is possible to improve the drilling accuracy and to extend the life of the drilling tool.

An apparatus for drilling a workpiece comprises a shaft portion including a holder for holding a drilling tool rotating around a first axis. A reduction gear is connected to the shaft portion. A cylindrical member, including an outer cylinder and an inner cylinder, rotatably contains the shaft portion at an eccentric position. The cylindrical member is connected to the output shaft of the reduction gear and is rotated around a second axis parallel to the first axis. A slide containing cylinder contains the shaft portion, the reduction gear and the cylindrical member. The slide containing cylinder has a sliding structure for axially moving the shaft portion, the reduction gear and the cylindrical member. The workpiece is drilled by simultaneously performing a rotation around the first axis, a revolution around the second axis and an axial movement of the drilling tool. The drilling tool is rotated by the shaft portion which, in turn, rotates the input shaft of the reduction gear. Simultaneously, the cylindrical member, connected to the output shaft of the reduction gear, is rotated around the second axis at a predetermined reduction ratio.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal section view of a first embodiment of the apparatus for drilling a workpiece.

FIG. 2 is a side elevation view of the apparatus for drilling a workpiece of FIG. 1 during advancing state.

FIG. 3 is a side elevation view of the apparatus for drilling a workpiece of FIG. 1 during reversing state.

FIG. 4 is a side elevation view seen from an arrow A-A of FIG. 1.

FIG. 5 is a cross-section view taken along line B-B of FIG. 1 showing an example of a stopper mechanism of a ball nut.
FIG. 5(a) shows a 0° rotation angle of the ball nut.
FIG. 5(b) shows a 90° rotation angle of the ball nut.
FIG. 5(c) shows a 180° rotation angle of the ball nut.
FIG. 5(d) shows a 270° rotation angle of the ball nut.

FIG. 6 is a side elevation view seen from an arrow C-C of FIG. 1.

FIG. 7 is a cross-section view taken along line C-C of FIG. 1 showing an operation of a HARMONIC DRIVE™.
FIG. 7(a) shows a 0° rotation angle of the HARMONIC DRIVE™.
FIG. 7(b) shows a 90° rotation angle of the HARMONIC DRIVE™.
FIG. 7(c) shows a 360° rotation angle of the HARMONIC DRIVE™.

FIG. 8 is a cross-section view taken along line D-D of FIG. 1 showing an advancing turbine.

FIG. 9 is a cross-section view taken along line E-E of FIG. 1 showing a reversing turbine.

FIG. 10 is a cross-section view taken along line F-F of FIG. 1 showing a tool mounting table.

FIG. 11 is an explanatory view of drilling.
FIG. 11(a) shows a 0° revolution angle of a shaft portion.
FIG. 11(b) shows a 90° revolution angle of a shaft portion.
FIG. 11(c) shows a 180° revolution angle of a shaft portion.
FIG. 11(d) shows a 270° revolution angle of a shaft portion.
FIG. 11(e) shows a 360° revolution angle of a shaft portion.

FIG. 12 is a cross-sectional plan view of a mounting state of a slide guide.

FIG. 13 is an explanatory view of a method of adjusting an amount of eccentricity.
FIG. 13(a) is a schematic cross-sectional plan view of an outer cylinder, an inner cylinder and the shaft portion.
FIG. 13(b) is a drawing of an amount of eccentricity when the phase angle of the inner cylinder relative to an outer cylinder is θ.

FIG. 14 is a cross-sectional side elevation view of an embodiment where a planetary gear mechanism is applied to an output shaft of the HARMONIC DRIVE™.

FIG. 15 is a cross-sectional view taken along line G-G of FIG. 14.

FIG. 16 is another cross-sectional side elevation view of an embodiment where a differential gear mechanism is applied to an output shaft of the HARMONIC DRIVE™.

FIG. 17 is a cross-sectional side elevation view of an embodiment provided with a stroke adjusting stopper.

FIG. 17(a) shows an advancing state.

FIG. 17(b) shows a state where a valve shifting lever is switched to a reverse side.

FIG. 17(c) shows a reversing state.

FIG. 17(d) shows a neutral state.

FIG. 18 is a cross-sectional side elevation view of an embodiment provided with an advance/reverse switching lever.

FIG. 18(a) shows a neutral state.

FIG. 18(b) shows an advancing state.

FIG. 18(c) shows a state where a valve shifting lever is switched to a reverse side.

FIG. 18(d) shows a reversing state.

FIG. 19 is a cross-sectional side elevation view of a drilling machine.

FIG. 20 is a cross-sectional plan view of the drilling machine of FIG. 19.

FIG. 21 is a side elevation view of the drilling machine of FIG. 19.

FIG. 22 is a cross-sectional front elevation view of a hand drilling machine.

FIG. 23 is a cross-sectional plan view of the hand drilling machine of FIG. 22.

FIG. 24 is a front elevation view of the hand drilling machine of FIG. 22.

FIG. 25 is a cross-sectional view of a workpiece of CFRP.

DETAILED DESCRIPTION

A first embodiment will be described in detail with reference to FIGS. 1-13.

FIG. 1 is a longitudinal section view of a first embodiment of the apparatus for drilling a workpiece. FIG. 2 is a side elevation view of the apparatus for drilling a workpiece of FIG. 1 during an advancing state. FIG. 3 is a side elevation view of the apparatus for drilling a workpiece of FIG. 1 during a reversing state. FIG. 4 is a side elevation view seen from an arrow A-A of FIG. 1. FIG. 5 is a cross-section view taken along line B-B of FIG. 1 showing an example of a stopper mechanism of a ball nut. FIG. 5(a) shows a 0° rotation angle of the ball nut. FIG. 5(b) shows a 90° rotation angle of the ball nut. FIG. 5(c) shows a 180° rotation angle of the ball nut. FIG. 5(d) shows a 270° rotation angle of the ball nut. FIG. 6 is a side elevation view seen from an arrow C-C of FIG. 1. FIG. 7 is a cross-section view taken along line C-C of FIG. 1 showing an operation of a HARMONIC DRIVE™. FIG. 7(a) shows a 0° rotation angle of the HARMONIC DRIVE™. FIG. 7(b) shows a 90° rotation angle of the HARMONIC DRIVE™, and FIG. 7(c) shows a 360° rotation angle of the HARMONIC DRIVE™.

FIG. 8 is a cross-section view taken along line D-D of FIG. 1 showing an advancing turbine. FIG. 9 is a cross-section view taken along line E-E of FIG. 1 showing a reversing turbine. FIG. 10 is a cross-section view taken along line F-F of FIG. 1 showing a tool mounting table. FIG. 11 is an explanatory view showing drilling steps. FIG. 11(a) shows a 0° revolution angle of a shaft portion. FIG. 11(b) shows a 90° revolution angle of a shaft portion. FIG. 11(c) shows a 180° revolution angle of a shaft portion. FIG. 11(d) shows a 270° revolution angle of a shaft portion. FIG. 11(e) shows a 360° revolution angle of a shaft portion. FIG. 12 is a cross-sectional plan view showing a mounting state of a slide guide. FIG. 13 is an explanatory view showing a method of adjusting an amount of eccentricity. FIG. 13(a) is a schematic cross-sectional plan view of an outer cylinder, an inner cylinder and the shaft portion. FIG. 13(b) is a drawing showing an amount of eccentricity when the phase angle of the inner cylinder relative to an outer cylinder is θ.

As shown in FIG. 1, the drilling apparatus includes a reduction gear (e.g. HARMONIC DRIVE™) 14 connected to a shaft portion 3 that includes a holder 2 for holding drilling tool 1, such as an end mill, rotating around a first axis C1. A cylindrical member (outer cylinder 19 and inner cylinder 20) is connected to an output shaft 14a of the reduction gear 14. The cylindrical member contains the shaft portion 3 rotatably at an eccentric position. The cylindrical member rotates around a second axis C2 parallel with the first axis C1.

As shown in FIGS. 1 and 4, the drilling apparatus includes a slide containing cylinder 17 rotatably containing the cylindrical member (outer cylinder 19 and inner cylinder 20) and axially slidable on guide rails 22b. A cylindrical bottomed housing 7 covers the slide containing cylinder 17. The housing 7 includes sliders 22a (including therein a plurality of rollers) that are movably connectable, via guide rails 22b mounted on the slide containing cylinder 17, in order to axially move the slide containing cylinder 17. In general, a combination of the sliders 22a and the guide rails 22b is called a slide guide 22, as shown in FIG. 4. A jig mounting table 6 is secured to a flange portion 7a of the housing 7 via bolts (not shown).

A ball screw 12 is connected to the shaft portion 3 via a coupling 11. A ball nut 13 rotatably holds the ball screw 12. A cap 10 is arranged on the bottom of the housing 7.

It is possible to use various kinds of end mills, e.g., a standard end mill, a roughing end mill, ball end mill etc. of various tool material to the drilling tool. The end mill 1 is preferably a square end mill of e.g. Φ4 mm-Φ12 mm. The end mill 1 has cutting edges on its bottom surface and side surfaces. A surface of the workpiece 5 is cut by the bottom cutting edges and an inner circumferential surface of an aperture is cut by side cutting edges of the end mill 1.

The holder 2 is preferably a collet chuck. It is possible to use various kinds of drilling tool such as the end mill 1 having a wide range of diameter of Φ4 mm-Φ12 mm by exchanging the holder 2 to be mounted on the tip of the shaft portion 3.

As shown in FIG. 1, the shaft portion 3 includes a tip end portion 3a to secure the holder 2. A stepped portion 3b axially extends from the tip end portion 3a. A reversing turbine 16, including vanes having a torsional angle the same as that of the cutting edges of the end mill 1, is arranged on the shaft portion 3. An advancing turbine 15, including vanes having torsional angle opposite to that of the cutting edges of the end mill 1, is also arranged on the shaft portion 3. A fitting portion 3c is fit onto the input shaft 14b of the reduction gear 14. The shaft portion 3 is contained within the inner cylinder 20 via a plurality of bearings so that it can rotate around the first axis C1.

The cylindrical member includes the inner cylinder 20 arranged outside of the shaft portion 3 and the outer cylinder 19 fit onto the inner cylinder 20. The inner cylinder 20 is formed of two parts longitudinally separated by a plane through the axial center. The inner cylinder 20 is inserted into the outer cylinder 19 after the shaft portion 3 and the bearings have been contained in the outer cylinder. The outer cylindrical surface of the inner cylinder 20 is tapered to reduce its outer diameter toward the tip end portion 3a. The inner cylinder 20 is secured to the outer cylinder 19 with the inner cylinder 20 being pulled out to a position at which both tapered surfaces of the inner and outer cylinders 20, 19 contact each other by inserting the inner cylinder 20 into the outer cylinder 19. An eccentricity adjusting nut 18 is then fastened onto an outer thread (male thread) 20a. The amount of eccentricity can be adjusted by loosening the eccentricity adjusting nut 18 and then by securing the inner cylinder 20 relative to the outer cylinders 19 after the phase of them has been shifted. The inner circumferential surface (tapered surface) of the outer cylinder 19 and the outer circumferential surface (tapered surface) of the inner cylinder 20 are in a position eccentric from the axis C1 of the shaft portion 3. The distance between the first axis C1 (center of rotation) and the second axis C2 (center of revolution) can be adjusted by adjusting the phase of the inner cylinder 20 relative to the outer cylinder 19. It is sufficient that a ratio (d:t) of a diameter "d" of the end mill 1 and the distance (amount of eccentricity) "t" between the first axis C1 of the shaft portion 3 and the second axis C2 of the cylindrical member is range of 10:0.1-10:1.5 (exaggeratedly shown in drawings).

As shown in FIG. 13, C1 is the first axis (center of rotation, i.e. central axis of the shaft portion 3). C2 is the second axis (center of revolution, i.e. central axis of the outer cylinder 19). C3 is a central axis of the inner cylinder 20. e1 is the amount of eccentricity of the central axis C3 of the inner cylinder 20 relative to the central axis C2 of the outer cylinder 19. e2 is the amount of eccentricity of the central axis C1 of the shaft portion 3 relative to the central axis C3 of the inner cylinder 20. θ is a phase angle of the inner cylinder 20 relative to the outer cylinder 19 from a reference line where the three centers are positioned in line with other in the order of C2, C3 and C1. C1' is a center of rotation at a phase angle θ. "t" is a distance (amount of eccentricity) between the central axis C2 of the outer cylinder 19 and the center C1' of rotation of the shaft portion 3 and can be calculated as below:

$$t = \sqrt{[(e1)^2 + (e2)^2 - 2(e1) \times (e2) \times \cos(180° - \theta)]}$$
$$= \sqrt{[(e1)^2 + (e2)^2 + 2(e1) \times (e2) \times \cos\theta]}$$

For example, when e1=e=20.5 mm, t=√(0.5+0.5 cos θ), accordingly,
when θ=0°, t=1.000 mm
when θ=45°, t=0.924 mm
when θ=90°, t=0.707 mm
when θ=120°, t=0.500 mm
when θ=135°, t=0.383 mm, and
when θ=180°, t=0.000 mm A relation between the diameter "d" of the end mill 1 and a diameter "D" of an aperture to be drilled is D=d+2t.

As shown in FIG. 2, an outer circumferential surface of the inner cylinder 20 is formed with annular grooves 20b, 20d, 20f, 20h and 20j, in order from the outer thread 20a. A nozzle 20c, directed radially inward, extends from a portion of the groove 20b. The nozzle 20c extends to the inner circumference of the inner cylinder 20. The nozzle 20c forms an aperture for discharging air introduced to the reversing turbine 16. A radially inwardly directing nozzle 20e is positioned oppositely to the nozzle 20c from a portion of the groove 20d. The nozzle 20e extends to the inner circumference of the inner cylinder 20. The nozzle 20e forms an aperture for introducing air into the reversing turbine 16. Nozzles 20g, 20l also radially inwardly extend from the groove 20f. These nozzles 20g, 20l extend to the inner circumference of the inner cylinder 20 and form an aperture for discharging air during neutral. A nozzle 20i also radially inwardly extends from a portion of the groove 20h to the inner circumference of the inner cylinder 20 parallel with the nozzle 20e. The nozzle 20i forms an aperture to introduce air into the advancing turbine 15. As shown in FIG. 8, the nozzle 20i is arranged at a predetermined angle relative to a radius of the inner cylinder 20 so as to efficiently rotate the advancing turbine 15. A further nozzle 20k also extends to the inner circumference of the inner cylinder 20 to form an aperture for discharging air introduced to the advancing turbine 15. Similarly to the nozzle 20i, the nozzle 20k may be inclined relative to the radius of the inner cylinder 20 to improve the discharge of air.

As shown in FIG. 2, an outer circumferential surface of the outer cylinder 19 is formed with annular grooves 19a, 19c, 19e, 19g and 19i, in order from the end mill 1. A nozzle 19b, directed radially inward, extends from a portion of the groove 19a. The nozzle 19b extends to the inner circumference of the outer cylinder 19 and is communicated with the nozzle 20c of the inner cylinder 20. A radially inwardly extending nozzle 19d is positioned oppositely to the nozzle 19b of the groove 19c. The nozzle 19d extends to the inner circumference of the outer cylinder 19 and communicates with the nozzle 20e of the inner cylinder 20. Nozzles 19f, 19k also radially inwardly extend from the groove 19e. The nozzle 19f extends to the inner circumference of the outer cylinder 19 and communicates with the nozzle 20l of the inner cylinder 20. The nozzle 19k extends to the inner circumference of the outer cylinder 19 and communicates with the nozzle 20g of the inner cylinder 20. A nozzle 19h also radially inwardly extends from a portion of the groove 19g. The nozzle 19h extends to the inner circumference of the inner cylinder 20 in parallel with the nozzle 19d and communicates with the nozzle 20i of the inner cylinder 20. A nozzle 19j also extends radially inward from a potion of the groove 19i opposite to the nozzle 19h. The nozzle 19j extends to the inner circumference of the outer cylinder 19 and communicates with the nozzle 20k of the inner cylinder 20. As shown in FIG. 9, the nozzle 20c is arranged at a predetermined angle relative to a radius of the inner cylinder 20 so as to effectively discharge air. Similarly to the nozzle 20i, the nozzle 20e may be inclined relative to the radius of the inner cylinder 20 to efficiently rotate the reversing turbine 16.

As shown in FIG. 3 an inner circumferential surface of the slide containing cylinder 17 is formed with annular grooves 17a, 17c, 17e, 17g and 17i, in order from the end mill 1. A nozzle 17b, directed radially outward, extends from a portion of the groove 17a. The nozzle 17b extends to the outer circumference of the slide containing cylinder 17 and communicates with the nozzle 19b of the outer cylinder 19. A radially outwardly extending nozzle 17d from a portion of the groove 17c is positioned oppositely to the nozzle 17b. The nozzle 17d communicates with an introducing aperture 17k. Nozzles 17f, 17l also radially outwardly extend from the groove 17e. The nozzle 17f passes through the slide containing cylinder 17. The nozzle 17l communicates with an introducing aperture 17k axially extending within the slide containing cylinder 17. A nozzle 17j also extends radially outward from a portion of the groove 17i opposite to the nozzle 17h. The nozzle 17j extends to the outer circumference of the slide containing cylinder 17 and communicates with the aperture 7d of the outer cylinder 19. The introducing aperture 17k communicates with the nozzle 17d, 17l, 17h and its end portion communicates with the outer circumference of the slide containing cylinder 17.

As shown in FIGS. 4, 8, 9, and 12, the slide containing cylinder 17 can slide on the axially extending two slide guides 22 (forming a slider 22a) mounted on an inner surface of the housing 7, via guide rails 22b mounted on the slide containing cylinder 17.

As shown in FIG. 3, a cylindrical barrel of the housing 7 is formed with air discharging apertures 7b, 7c, 7d and an air intake aperture 7e radially extending through the barrel. The air discharging aperture 7b communicates with the nozzle 17b of the slide containing cylinder 17. The air discharging aperture 7c communicates with the nozzle 17f of the slide containing cylinder 17. The air discharging aperture 7d communicates with the nozzle 17j of the slide containing cylinder 17. The air intake aperture 7e communicates with the introducing aperture 17k of the slide containing cylinder 17. The inner circumferential surface of the housing 7 where the air discharging apertures 7b, 7d and the air intake aperture 7e are formed with an elongated recess so that compressed air can always communicate with the air discharging and intake apertures and nozzles even when the slide containing cylinder 17 axially slides.

As shown in FIG. 3, a valve 9, formed with three apertures, is arranged at substantially the middle portion of the nozzles 17d, 17l, 17h. The three apertures communicate with nozzles 17d, 17l, 17h when the valve 9 is axially shifted. Thus, air taken to the introducing aperture 17k can pass through the respective nozzles 17d, 17l, 17h. A valve shifting lever 8 is connected to one axial end of the valve 9, to axially shift the valve 9. The valve shifting lever 8 may be supported at its center so that it can return to its neutral position, shown in FIG. 1, by a spring arranged at its bottom.

When the valve shifting lever 8 is positioned at the neutral position as shown in FIG. 1, the introducing aperture 17k and the nozzle 17l communicate with each other. Thus, compressed air taken through the air intake aperture 7e passes through the nozzles 17l, 19f, 20l, 20g, 19k, 17f and is discharged from the air discharging aperture 7c. During which the shaft portion 3 does not rotate and the end mill 1 also does not rotate and revolve.

When the valve shifting lever 8 is moved toward a position opposite to the end mill 1 as shown in FIG. 2, the introducing aperture 17k and the nozzle 17h communicate with each other. Thus, compressed air taken through the air intake aperture 7e passes through the nozzles 17h, 19h, 20i to rotate the advancing turbine 15 (see FIG. 8). The compressed air is discharged from the air discharging aperture 7d through the nozzle 20k, 19j, 17j. During which, the advancing turbine 15 rotates clockwise around the first axis C1, the end mill 1 rotates clockwise, the cylindrical member (outer cylinder 19 and inner cylinder 20) rotates counterclockwise around the second axis C2, and the ball screw 12 is subjected to a reaction force from the ball nut 13 and axially pushes the cylindrical member etc. toward the end mill 1. Thus, the end mill 1 can obtain axial thrusting force while being simultaneously rotated and revolved. The maximum thrusting force is about 80-100 kgf.

When the valve shifting lever 8 is moved toward the end mill 1 as shown in FIG. 3, the introducing aperture 17k and the nozzle 17d communicate with each other. Thus, compressed air taken through the air intake aperture 7e passes through the nozzles 17d, 19d, 20e to rotate the reversing turbine 16. The compressed air is discharged from the air discharging aperture 7b through the nozzle 20c, 19b, 17b (see FIG. 9). During which, the reversing turbine 16 rotates counterclockwise around the first axis C1, the end mill 1 rotates counterclockwise, the cylindrical member (outer cylinder 19 and inner cylinder 20) rotates clockwise around the second axis C2, and the ball screw 12 is driven into the ball nut 13 and axially moves the cylindrical member etc. toward a direction opposite to the end mill 1. Thus, the end mill 1 can reverse while being simultaneously rotated and revolved.

Although it is shown in an illustrated embodiment that the shaft portion 3 is rotated by compressed air, the present disclosure is not limited to such a structure. It may be possible to use an electric motor etc. to drive the shaft portion 3.

As shown in FIGS. 1-3, a fitting portion 3a of the shaft portion 3 is fit with the input shaft 14b of the reduction gear 14 to impart rotation of the shaft portion 3 to the input shaft 14b. The inner cylinder 20 and the ball screw 12 are connected to the output shaft 14a of the reduction gear 14 to rotate them in a direction different from that of the shaft portion 3.

As shown in FIGS. 1 and 6, the reduction mechanism is preferably a HARMONIC DRIVE™ with a reduction ratio of about 1:140-1:70, more preferably of 1:120-1:80. The present disclosure is not limited to the HARMONIC DRIVE™ and it is possible to use other reduction gears such as a combination of a HARMONIC DRIVE™ and a differential gear mechanism. In such a case, the reduction ratio of the combined HARMONIC DRIVE™ and a differential gear mechanism is preferably about 1:140-1:70, more preferably about 1:120-1:80.

For example, when the reduction ratio of the reduction gear is 1:100, if the rotation speed of the end mill 1 is 2000-3000 rpm, its revolution speed will be 20-30 rpm.

In addition when the rotational directions of the input shaft and output shaft of the reduction gear 14 are inverse to each other, it is possible to perform a "down cut" where the directions of rotation and revolution of the end mill 1 are different from each other. When the rotational directions of the input shaft and output shaft of the reduction gear 14 are inverse, the ball screw 12 may be a left-hand thread.

As shown in FIGS. 6 and 7, the reduction gear (HARMONIC DRIVE™) 14 includes the input shaft 14b positioned at the center of the reduction gear 14. A wave generator 14c, having an oval cross-section, rotates together with the input shaft 14b. The output shaft (flex-spline) 14a of an elastic metal member has a thin walled cup-shaped configuration and is fit onto the outer circumference of the wave-generator 14c via rollers. A circular spline 14d is formed with an internal gear mating with an external gear of the output shaft 14a. The fitting portion 3c of the shaft portion 3 is fit onto the input shaft 14b. The inner cylinder 20 and the ball screw 12 are connected to the output shaft 14a. The circular spline 14d is secured to the housing 7 (not shown).

When the reduction ratio of the reduction gear is 1:100, it is possible to achieve this reduction ratio by setting the number of teeth formed on the outer circumference of the output shaft 14a at 99. The number of teeth formed on the inner circumference of the circular spline 14d is at 100. Then as shown in FIGS. 7(a)-7(c), the input shaft 14a is elastically deformed in accordance with rotation of the wave generator 14c attached to the input shaft 14b and mated with the internal gear formed on the inner circumference of the circular spline 14d. In this structure, when the input shaft is rotated once, the output shaft 14a rotates by one tooth opposite to the direction of the input shaft 14b relative to the circular spline 14d. Thus, the reduction ratio of 1:100 is obtainable.

A helical screw groove is formed on the outer circumference of the ball screw 12. A ball nut 13 is fit onto the ball screw 12 via a number of balls. A helical screw groove is formed on the inner circumference of the ball nut 13. The ball nut 13 is formed with an endless circulating passage using a bridge member formed with a connecting groove through which the balls are circulated. As shown in FIG. 4, the axial center of the ball screw 12 is, similar to that of the shaft portion 3 connected to the ball screw 12, eccentric from the outer cylinder 19 contained within the slide containing cylinder 17 by "t" (amount of eccentricity of the end mill).

As shown in FIG. 5, a radially extending rotation stopping long groove 13a is formed on one portion of the flange of the ball nut 13. A guiding groove 23a is formed on the bottom of the housing 7 that contacts the ball nut 13. An engaging shaft 23b is inserted into the guiding groove 23a and rotates along the inner circumferential surface of the guiding groove 23a. The engaging shaft 23b engages the rotation stopping groove 13a to limit the rotational movement of the ball nut 13 along the inner circumferential surface of the guiding groove 23a.

As shown in FIG. 5(a), the engaging shaft 23b is positioned at a lower position of the guiding groove 23a when the rotational angle is 0°. As shown in FIGS. 5(b)-5(d), the axial center of the ball nut 13 revolves around the second axis C2 as the shaft portion 3 rotates from the condition of FIG. 5(a) and the cylindrical member (outer cylinder 19 and inner cylinder 20) and the ball screw 12 revolve. During which, the engaging shaft 23b, engaging the rotation stopping groove 13a of the ball nut 13, moves within the guiding groove 23a although the ball nut 13 revolves. The ball nut 13 does not rotate. Owing to such a structure, the ball nut 13 can revolve on the same plane without rotation according to the revolution of the ball screw 12.

According to such a structure, the end mill 1 can revolve around the second axis C2 while simultaneously rotating around the first axis C1 to perform drilling of the workpiece 5. This occurs by rotating the shaft portion 3 which, in turn, rotates the end mill 1 and the input shaft 14b of the reduction gear 14. The cylindrical member (outer cylinder 19 and inner cylinder 20), connected to the output shaft 14a of the reduction gear 14, simultaneously rotates with the end mill 1.

The jig mounting table 6 is secured to a jig 4 placed on the surface of the workpiece 5 by bolts (not shown). As shown in FIG. 10, a drilling imaginary circle 6a is shown in the center of the jig mounting table 6. The end mill 1 is positioned at a position eccentrically from the drilling imaginary circle 6a. As shown in FIG. 1, a notch is formed on the end of the jig mounting table 6 and a stopper 21 is mounted in the notch. The axial movement of the slide containing member 17 can be limited before use of the drilling apparatus. In use of the drilling apparatus, the stopper 21 is disengaged to allow the slide containing cylinder 17 etc. to be axially moved.

As shown in FIGS. 11(a)-11(e), the end mill 1 is positioned at an eccentric position from the drilling imaginary circle 6a. In these drawings, the end mill 1 rotates clockwise and simultaneously revolves counterclockwise. For example, a diameter "d" of the end mill 1 is 5 mm, a diameter "D" of the drilling imaginary circle 6a is 6 mm, and an amount of eccentricity "t" of the end mill 1 is 0.5 mm.

A second embodiment will be described in detail with reference to FIGS. 14 and 15.

FIG. 14 is a cross-sectional side elevation view of an embodiment where a planetary gear mechanism is applied to an output shaft of the HARMONIC DRIVE™. FIG. 15 is a cross-sectional view taken along line G-G of FIG. 14.

In this embodiment, the reduction gear 14 (2) includes the HARMONIC DRIVE™ 30 and a planetary gear mechanism 31 as shown in FIGS. 14 and 15. The fitting portion 3c of the shaft portion 3 is fit into the input shaft 30b of the HARMONIC DRIVE™ 30. The input shaft 31a of the planetary gear mechanism 31 is connected to the output shaft 30a of the HARMONIC DRIVE™ 30. A pinion 31b is secured on the input shaft 31a. The pinion 31b mates with three gears 31c. The pinion 31b and gears 31c are contained within the output shaft (internal gear) 31d so that the pinion 31b is arranged at its center as shown in FIG. 15. One end of the output shaft 31d extends axially and is connected to the inner cylinder 20. A connecting member 31e is connected to the side of the output shaft 31d via bolts and further connected to the ball screw 12 via a coupling 11.

In this embodiment, when the shaft portion 3 is rotated, the input shaft 30b of the HARMONIC DRIVE™ 30 is rotated. The output shaft 30a is also rotated at a predetermined reduction ratio. The input shaft 31a of the planetary gear mechanism 31 is rotated. The pinion 31b is rotated, and further the gears 31c mating with the pinion 31b are rotated. The inner cylinder 20 is rotated together with the output shaft 31d and the end mill 1 can be revolved.

When the rotational directions of the input shaft 30b and the output shaft 30a of the HARMONIC DRIVE™ 30 are the same, it is possible to rotate the input shaft 30b and the output shaft 31d of the planetary gear mechanism 31 in an inverse direction to each other. Thus, it is possible to achieve the down cut where the rotation and the revolution of the end mill 1 are different from each other. In addition, when the rotational direction of the input shaft 30b and the output shaft 30a of the HARMONIC DRIVE™ 30 are inversed, it is possible to rotate the input shaft 30b and the output shaft 31d of the planetary gear mechanism 31 in the same direction. Thus, it is possible to achieve the up cut where the rotation and the revolution of the end mill 1 are the same. It is preferable that the reduction ratio in the combination of the HARMONIC DRIVE™ 30 and the planetary gear mechanism 31 is about 1:140-1:70, more preferably 1:120-1:80.

A third embodiment will be described in detail with reference to FIG. 16.

FIG. 16 is a cross-sectional side elevation view of an embodiment where a differential gear mechanism is applied to an output shaft of the HARMONIC DRIVE™.

In this embodiment, the reduction gear 14 (3) comprises the HARMONIC DRIVE™ 30 and a differential gear mechanism 32 as shown in FIG. 16. The fitting portion 3c of the shaft portion 3 is fit into the input shaft 30b of the HARMONIC DRIVE™ 30. The input shaft 32a of the differential gear mechanism 32 is connected to the output shaft 30a of the HARMONIC DRIVE™. A bevel gear 32b is secured on the input shaft 32a. The bevel gear 32b mates with two bevel gears 32c, 32d. These bevel gears 32c, 32d mate with a bevel gear 32e. An axially extending output shaft 32f of the bevel gear 32e is secured to a connecting member 32g. The connecting member 32g has an axially extending cup shaped portion that is secured with the inner cylinder 20. The connecting member 32g has also an oppositely extending shaft portion that is connected, via a coupling 11, to the ball screw 12.

In this embodiment, the input shaft 30b of the HARMONIC DRIVE™ 30 is rotated and the output shaft 30a is rotated at a predetermined reduction ratio. The input shaft 32a of the differential gear mechanism 32 is rotated. The bevel pinion 32b is rotated. Further, the bevel gears 32c, 32d are rotated. Accordingly, the bevel gear 32e and the output shaft 32f are rotated. Thus, by rotating the shaft portion 3, the end mill 1 and the inner cylinder 20 are revolved, and accordingly the end mill 1 is rotated.

When the rotational directions of the input shaft 30b and the output shaft 30a of the HARMONIC DRIVE™ 30 are same, it is possible to rotate the input shaft 30b and the output shaft 32f of the differential mechanism 32 in inverse directions to each other. Thus, it is possible to achieve the down cut where the rotation and the revolution of the end mill 1 are different to each other. In addition, when the rotational directions of the input shaft 30b and the output shaft 30a of the HARMONIC DRIVE™ 30 are inverse, it is possible to rotate the input shaft 30b and the output shaft 32f of the differential gear mechanism 32 in the same direction. Thus, it is possible to achieve the up cut where the rotation and the revolution of the end mill 1 are the same. It is preferable that the reduction ratio in the combination of the HARMONIC DRIVE™ 30 and the differential gear mechanism is about 1:140-1:70, more preferably 1:120-1:80.

A fourth embodiment will be described in detail with reference to FIG. 17.

FIG. 17 is a cross-sectional side elevation view of an embodiment provided with a stroke adjusting stopper. FIG. 17(a) shows an advancing state. FIG. 17(b) shows a state where a valve shifting lever is switched to a reverse side. FIG. 17(c) shows a reversing state. FIG. 17(d) shows a neutral state.

In this embodiment, stroke adjusting stoppers 41a, 41b are arranged at two positions within a moving range of a valve shifting lever 8, as shown in FIG. 17. If the valve shifting lever 8 is switched (moved) to the side of the end mill 1, the air introducing aperture 17k and the nozzle 17d communicate with each other. Thus, compressed air can be supplied to the advancing turbine 15 through the nozzle 17d as shown in FIG. 17(a).

In this illustrated embodiment, the arrangement of the advancing turbine 15 and the reversing turbine 16 are shown inverse of those shown in FIGS. 1-3.

When the advancing turbine is driven, the shaft portion 3 and the ball screw 12 are rotated. Thus, the slide containing cylinder 17 is advanced by the reaction force of the ball nut 13. Thus, the valve shifting lever 8 abuts against the stroke adjusting stopper 41a. Therefore, the valve shifting lever 8 is moved toward a side opposite to the end mill 1 as shown in FIG. 17(b). Accordingly, the air introducing aperture 17k and the nozzle 17h communicate with each other. Thus, compressed air can be supplied to the reversing turbine 16 through the nozzle 17h.

Thus, the slide containing cylinder 17 is reversed as shown in 17(c). If the slide containing cylinder 17 is reversed, the valve shifting lever 8 will soon abut against the stroke adjusting stopper 41b. It will be returned to the neutral position as shown in FIG. 17(d). When the valve shifting lever 8 is returned to the neutral position, the air introducing aperture 17k and the nozzle 17l communicate with each other. Thus, compressed air can be discharged without driving any of the turbines 15, 16.

A fifth embodiment will be described in detail with reference to FIG. 18.

FIG. 18 is a cross-sectional side elevation view of an embodiment provided with an advance/reverse switching lever. FIG. 18(a) shows a neutral state. FIG. 18(b) shows an advancing state. FIG. 18(c) shows a state where a valve shifting lever is switched to a reverse side. FIG. 18(d) shows a reversing state.

In this embodiment, a knock pin 42, having L-shaped configuration, is mounted on the slide containing cylinder 17 at the right hand of the valve shifting lever 8. A bell crank shaped advance/reverse switching lever 43 is arranged on the housing 7 at the right hand of the knock pin 42. The advance/reverse switching lever 43 is pivoted on the housing 7 at an upper portion thereof. A lower portion of the advance/reverse lever 43 is formed with an elongate aperture. A piston 44 is connected to the advance/reverse switching lever 43 via a pin inserted in the elongate aperture. The piston 44 is arranged axially slidably in a bore axially extending in the slide containing cylinder 17. A spring 45 is connected to the advance/reverse lever 43 at substantially center thereof for normally urging the piston 44 toward the side of the end mill 1.

When the valve shifting lever 8 is in the neutral position, the air introducing aperture 17k and the nozzle 17l communicate with each other. Thus, compressed air is discharged without driving the turbines 15, 16, as shown in FIG. 18(a). The valve shifting lever 8 is moved toward a direction opposite to the end mill 1 as shown in FIG. 18(b). The air introducing aperture 17k and the nozzle 17h communicate with each other. Thus, compressed air is supplied to the advancing turbine 15 through the nozzle 17h. Thus, the slide containing cylinder 17 is advanced. When the slide containing cylinder 17 is further advanced as shown in FIG. 18(c), the tip end of the knock pin 42 abuts against the top end of the advance/reverse switching lever 43. Accordingly, the advance/reverse switching lever 43 pivots around its pivot shaft secured on the housing 7 and push the piston 44 to a direction opposite to the end mill 1 and axially slide the valve 9. Thus, the air introducing aperture 17k and the nozzle 17d communicate with each other. Compressed air is supplied to the reversing turbine 16 through the nozzle 17d. Thus, the slide containing cylinder 17 is reversed.

A sixth embodiment will be described in detail with reference to FIGS. 19, 20 and 21.

FIG. 19 is a cross-sectional side elevation view of a drilling machine. FIG. 20 is a cross-sectional plan view of the drilling machine of FIG. 19. FIG. 21 is a side elevation view of the drilling machine of FIG. 19. This embodiment shows an example where the drilling apparatus of the present disclosure is applied to a drilling machine. Thus, its main structure is substantially same as the previous embodiments.

As shown in FIG. 19, this embodiment includes a shaft portion 53 including a holder 52 to hold an end mill 51 rotating around a first axis. A reduction mechanism (HARMONIC DRIVE™ and planetary gear mechanism) 64 are connected to the shaft portion 53. A cylindrical member (outer cylinder 69 and inner cylinder 70) rotatably contains the shaft portion 53 at an eccentric position. The cylindrical member rotates around a second axis parallel with the first axis. Such a structure enables the end mill 51 to simultaneously perform rotation and revolution. This embodiment further includes a slide containing cylinder 67 rotatably containing the cylindrical member (outer cylinder 69 and inner cylinder 70) and axially slidable in an outer square cylindrical housing 57 covering the slide containing cylinder 67. The slide containing cylinder 67 can axially slide within the housing 57 via axially extending guiding rails 72b mounted on the slide containing cylinder 67 and sliders 72a (containing roller bearings) arranged within the housing 57.

Shown under the drilling apparatus is a workpiece 55 to be drilled by the end mill 51 and a jig (pressing member) 54 laid on the workpiece 55.

In this embodiment, a motor (3-phase induction electric motor) 65 is arranged at an upper-middle portion of the shaft portion 53. The motor 65 is supplied with electric power via an electric cord 82 and wiring arranged within the cylindrical member (inner cylinder 70 and outer cylinder 69) and the slide containing cylinder 67. A brush 81 is mounted on the inner circumference of the slide containing cylinder 67. A ring shaped conductive contact 69a, slidably contacting the brush 81, is mounted on the outer circumference of the outer cylinder 69. The electric power supplied to the motor 65 is on/off controlled by a switch 83.

The drilling machine where the drilling apparatus is applied of this embodiment is shown in FIGS. 20 and 21. The drilling machine includes a base 90 and a table 91 where the workpiece 55 is placed. A column 92 vertically extends from the base 90. A drilling apparatus including a housing 57 is slidably mounted on the column 92. A rack 86 is mounted on the back of the housing 57. A pinion 85 mates with the rack 86. A lever handle 84 is mounted on a central shaft of the pinion 85. A wire 87 is at one end and is secured on the back of the housing 57. A pulley 89 receives the wire 87. A dashpot 88 secured to the wire 87 returns the mechanism.

By moving the lever handle 84 downward, the pinion 85 is rotated and thus the rack 86 is moved downward. Accordingly, the drilling apparatus is moved downward and drilling can be performed with the end mill 51 that is simultaneously rotated and revolved. When the housing 57 moves downward, the wire 87 is pulled upward via pulley 89 and the dashpot 88 moves upward. The dashpot 88 always applies a force on the housing via the wire 87 to resist its downward movement. Thus, the drilling apparatus can be moved upward toward its original position when an operator releases the lever handle 84. In accordance with the rotation of the pinion 85 that meshes with the rack 86, the lever handle 84 also returns its original position.

A seventh embodiment will be described in detail with reference to FIGS. 22-24.

FIG. 22 is a cross-sectional front elevation view of a hand drilling machine. FIG. 23 is a cross-sectional plan view of the hand drilling machine of FIG. 22. FIG. 24 is a front elevation view of the hand drilling machine of FIG. 22. This embodiment shows an example where the drilling apparatus of the present disclosure is applied to a hand drilling machine. Thus, its main structure is substantially the same as the previous embodiments.

As shown in FIG. 22, this embodiment includes the shaft portion 53 including the holder 52 to hold the end mill 51 rotating around the first axis. The reduction mechanism (HARMONIC DRIVE™ and planetary gear mechanism) 64 is connected to the shaft portion 53. A cylindrical member (outer cylinder 69 and inner cylinder 70) rotatably contains the shaft portion 53 at an eccentric position. The cylindrical member rotates around a second axis parallel with the first axis. Such a structure enables the end mill 51 to simultaneously perform rotation and revolution. This embodiment further includes a slide containing cylinder 67 rotatably containing the cylindrical member (outer cylinder 69 and inner cylinder 70) and axially slidable, on an outer square cylindrical housing 57 covering the slide containing cylinder 67. The slide containing cylinder 67 can axially slide within the housing 57 via axially extending guiding rails 72b and sliders 72a sliding on the guiding rails 72b.

Vertical elongated apertures are formed on the upper sides of the housing 57. Two gripping handles 101, secured on the slide containing cylinder 67, horizontally project through the vertical elongated apertures and are vertically movable. Vertically upward and downward movement of the gripping handles 101 enables movement of the drilling apparatus upward and downward. Thus, drilling of the workpiece 55 can be performed similar to the previous embodiments by the end mill 51 simultaneously rotating and revolving.

Four adjustable legs 102 are arranged at four corners of the housing 57. Each leg 102 has an adjusting rod 103 and a securing knob 104 to adjust the height of the drilling apparatus. The four legs 102 can be independently moved so as to enable drilling be adapted to a workpiece 55 having a curved surface.

Similarly to the sixth embodiment, one end of the wire 87 is secured to the back of the housing 57. The other end is connected to the dashpot 88 via the pulley 89. Accordingly, when an operator release the grip handle 101 after the drilling apparatus has been moved downward, the drilling apparatus, including the housing 57, can be returned its original position by the returning force of the dashpot 88.

Four stoppers 105 are mounted on the top surface of the housing 57 so that they abut and stop the ascending slide containing cylinder 67.

Shown under the drilling apparatus are a workpiece 55 to be drilled by the end mill 51 and a jig (pressing member) 54 laid on the workpiece 55.

Also in this embodiment, the motor (3-phase induction electric motor) 65 is arranged at an upper-middle portion of the shaft portion 53. The motor 65 is supplied with electric power via the electric cord 82 and wiring arranged within the cylindrical member (inner cylinder 70 and outer cylinder 69) and the slide containing cylinder 67. The brush 81 is mounted on the inner circumference of the slide containing cylinder 67. The ring shaped conductive contact 69a, slidably contacting the brush 81, is mounted on the outer circumference of the outer cylinder 69. The electric power supplied to the motor 65 is on/off controlled by a switch 83.

The workpiece to be drilled will be described with reference to FIG. 25 where a cross-sectional view of a workpiece of CFRP is shown.

A workpiece 5 (workpiece 55 in FIGS. 19, 22 and 24) is a carbon fiber reinforced plastic (CFRP) which is formed of a plurality of layers of epoxy where carbon reinforcing fibers are included. As shown in FIG. 25, such a CFRP includes a plastic laminated body including a plurality of fiber reinforced epoxy layers. The reinforcing fibers included in each resin layer may be arranged so that they run in parallel with each other or cross orthogonally or obliquely. In addition, the reinforcing fibers may be arranged in each resin layer as a knitted state where fibers are knitted with each other, a webbed state, where fibers are webbed with each other, and a nonwoven fabric state where fibers are arranged as a nonwoven fabric.

The carbon fiber reinforced plastic (CFRP) is manufactured by forming a sheet shaped prepreg where reinforcing carbon fibers are included in thermosetting resin e.g. epoxy. Heating and pressing the prepreg after straightening the reinforcing fibers in their extending direction. Laminating a plurality of prepregs. The present disclosure can be applied to a mono-layer plastic board. However in the mono-layer plastic board, it is preferable that the reinforcing fibers are the knitted state or the woven state.

The apparatus and method for drilling a workpiece of the present disclosure can be applied to drilling apparatus and drilling method for drilling a workpiece such as a fiber reinforced plastic (FRP) board using an end mill.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. An apparatus for drilling a workpiece comprising:
a shaft portion including a holder for holding a drilling tool rotating around a first axis;
a reduction gear connected to the shaft portion;
a cylindrical member including an outer cylinder and an inner cylinder for rotatably containing the shaft portion at an eccentric position, said cylindrical member connected to an output shaft of the reduction gear and rotating around a second axis parallel to the first axis;

a slide containing cylinder for containing the shaft portion, the reduction gear and the cylindrical member, said slide containing cylinder including a sliding structure for axially moving the shaft portion, the reduction gear and the cylindrical member; and the drilling tool rotating around the first axis while simultaneously revolving around the second axis and moving axially, the drilling tool rotated by the rotation of the shaft portion which, in turn, rotates the input shaft that simultaneously rotates the cylindrical member, connected to the output shaft of the reduction gear, around the second axis at a predetermined reduction ratio.

2. The apparatus for drilling a workpiece of claim 1, wherein the drilling of the workpiece is performed by a down cut where the directions of the rotation and revolution of the drilling tool are different from each other.

3. The apparatus for drilling a workpiece of claim 1, wherein a ratio of a diameter of the drilling tool and a distance between the first axis of the shaft portion and the second axis of the cylindrical member is in a range of 10:0.1-10:1.5.

4. The apparatus for drilling a workpiece of claims 1, wherein the predetermined reduction ratio of the reduction gear between the shaft portion and the cylindrical member is in a range of 1:140-1:70.

5. The apparatus for drilling a workpiece of claim 1, wherein the speed of the rotation of the drilling tool is in a range of 1500-4000 rpm, and the predetermined reduction ratio is in a range of 1:120-1:80.

6. The apparatus for drilling a workpiece of claim 1, wherein the drilling tool is an end mill.

7. The apparatus for drilling a workpiece of claim 1, wherein the shaft portion includes turbines, and the driving mechanism of the turbines is air.

8. The apparatus for drilling a workpiece of claim 1, wherein the workpiece is a laminated member of fiber reinforced plastic.

9. A method for drilling a workpiece comprising:
providing a shaft portion including a holder for holding a drilling tool rotating around a first axis;
a reduction gear connected to the shaft portion;
a cylindrical member including an outer cylinder and an inner cylinder for rotatably containing the shaft portion at an eccentric position, said cylindrical member connected to an output shaft of the reduction gear and rotating around a second axis parallel to the first axis, a slide containing cylinder for containing the shaft portion, the reduction gear and the cylindrical member, said slide containing cylinder including a sliding structure for axially moving the shaft portion, the reduction gear and the cylindrical member; and
drilling a workpiece while simultaneously rotating the drilling tool around the first axis, revolving the drilling tool around the second axis and axially moving the drilling tool;
rotating the drilling tool by rotating the shaft portion and rotating the input shaft of the reduction gear;
simultaneously rotating the cylindrical member, connected to the output shaft of the reduction gear, around the second axis at a predetermined reduction ratio.

10. The method for drilling a workpiece of claim 9, wherein the drilling of the workpiece is performed by a down cut where the directions of rotation and revolution of the drilling tool are different from each other.

11. The method for drilling a workpiece of claim 9, wherein the speed of the rotation of the drilling tool is in a range of 1500-4000 rpm, and the predetermined reduction ratio is in a range of 1:120-1:80.

12. The method for drilling a workpiece of claim 9, wherein the workpiece is a laminated member of fiber reinforced plastic.

* * * * *